US008296228B1

(12) United States Patent
Kloor

(10) Patent No.: US 8,296,228 B1
(45) Date of Patent: Oct. 23, 2012

(54) DUAL TRANSACTION AUTHORIZATION SYSTEM AND METHOD

(76) Inventor: Harry Thomas Kloor, Woodland Hills, CA (US)

( * ) Notice: Subject to any disclaimer, the term of this patent is extended or adjusted under 35 U.S.C. 154(b) by 2186 days.

(21) Appl. No.: 09/714,018

(22) Filed: Nov. 16, 2000

Related U.S. Application Data

(60) Provisional application No. 60/166,837, filed on Nov. 22, 1999.

(51) Int. Cl.
*G06Q 40/00* (2006.01)
(52) U.S. Cl. .......................... 705/39; 705/26.1
(58) Field of Classification Search .................. 705/44, 705/45, 26, 27, 75, 67, 38, 39, 40, 41, 42, 705/43
See application file for complete search history.

(56) References Cited

U.S. PATENT DOCUMENTS

| | | | | |
|---|---|---|---|---|
| 5,621,201 | A * | 4/1997 | Langhans et al. | 235/380 |
| 5,748,783 | A * | 5/1998 | Rhoads | 382/232 |
| 5,760,771 | A * | 6/1998 | Blonder et al. | 345/854 |
| 5,826,245 | A | 10/1998 | Sandberg-Diment | 705/44 |
| 5,845,267 | A * | 12/1998 | Ronen | 705/40 |
| 5,903,878 | A * | 5/1999 | Talati et al. | 705/26 |
| 5,974,146 | A | 10/1999 | Randle et al. | 380/24 |
| 6,049,785 | A * | 4/2000 | Gifford | 705/39 |
| 6,055,505 | A * | 4/2000 | Elston | 705/1 |
| 6,064,990 | A * | 5/2000 | Goldsmith | 705/75 |
| 6,085,171 | A | 7/2000 | Leonard | 705/26 |
| 6,088,683 | A * | 7/2000 | Jalili | 705/26 |
| 6,163,771 | A | 12/2000 | Walker et al. | 705/18 |
| 6,192,131 | B1 | 2/2001 | Geer, Jr. et al. | 380/283 |
| 6,330,550 | B1 * | 12/2001 | Brisebois et al. | 705/75 |
| 6,330,672 | B1 * | 12/2001 | Shur | 713/176 |
| 6,390,362 | B1 * | 5/2002 | Martin | 235/379 |
| 6,442,526 | B1 * | 8/2002 | Vance et al. | 705/5 |
| 6,473,740 | B2 * | 10/2002 | Cockrill et al. | 705/27 |
| 6,529,725 | B1 * | 3/2003 | Joao et al. | 455/406 |
| 6,535,855 | B1 * | 3/2003 | Cahill et al. | 705/1 |

FOREIGN PATENT DOCUMENTS

WO WO 96/32700 * 10/1996

OTHER PUBLICATIONS

"Against the moniker market: The price of my good name: A web serach showed I'm no longer the master of my domain", Laycock, Michael, The Vancourver Sun, Sep. 99, p. E.7.*

* cited by examiner

*Primary Examiner* — M. Thein

(57) ABSTRACT

A general feature of the present invention is to provide a dual authorizing system and method to prevent fraudulent use of credit cards and E-signature. To do so, a third party verifier is provided to ensure that the rightful owner of the credit card or E-signature approves of the transaction before the purchase is completed between the merchant and the credit card user. This is accomplished by linking the owner's Internet address or addresses or other communication device address to the credit card number, and storing this information with the third party verifier, such as an Authorization agent. Once the card is used to make a purchase, the Authorization agent is notified of the purchase. The Authorization agent then pulls the corresponding Internet address or communication address for the credit card number, then sends an approval request message to the owner at the owner's Internet address or communication device. This way, only the owner who had previously registered the credit card number with the Authorization agent is notified of the pending purchase and can approve or deny the purchase and, thereby preventing unauthorized user from making purchase using the owner's credit card.

4 Claims, 20 Drawing Sheets

CHECK OUT

CREDIT CARD OWNER'S

FIRST NAME

MIDDLE

LAST

CREDIT CARD NO.

EXP. DATE

SHIP TO ADDRESS

```
ATTENTION - SOFTCARD HAS RECIEVED A PURCHASE APPROVAL REQUEST

CARD HOLDER'S NAME        [                    ]

PLACE OF TRANSACTION      [                    ]

ITEM(S) TO BE PURCHASED   | 1.       | $$$$$ |
                              | 2.       | $$$$$ |
                              | 3.       | $$$$$ |

TOTAL                     [                    ]
    DATE & TIME               [                    ]

DO YOU APPROVE OF THIS TRANSACTION ?

[  YES  ]                    [  NO  ]
```

FIG. 12

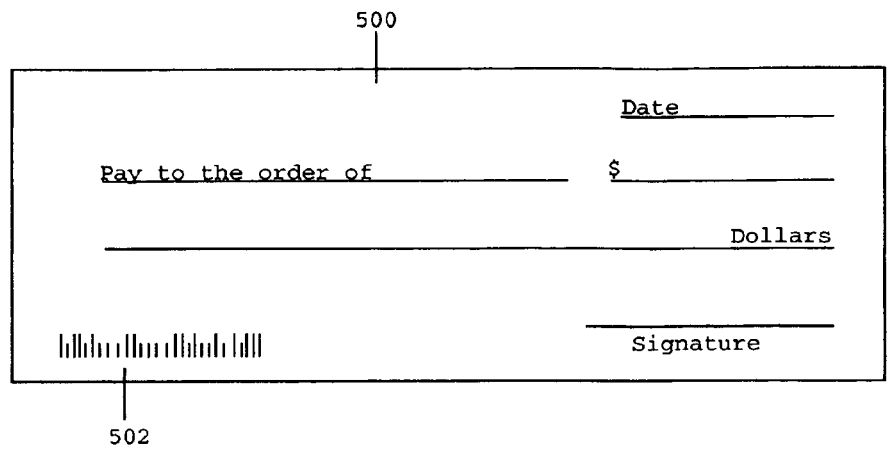
FIG. 15A
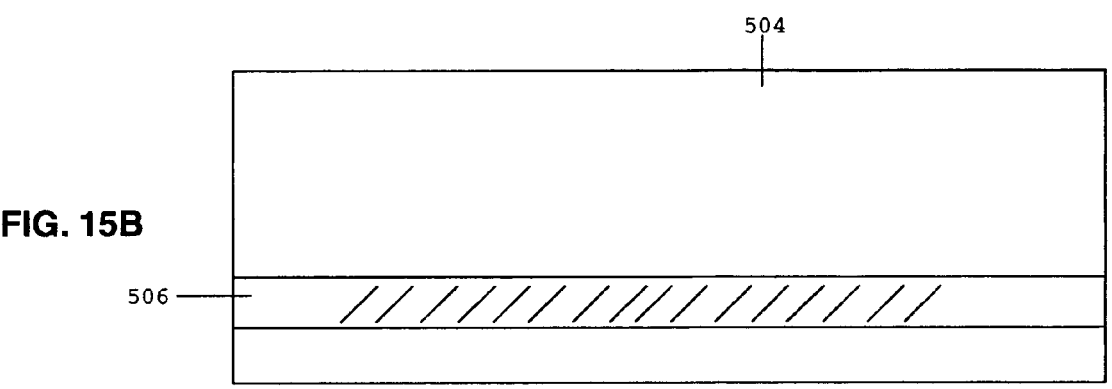
FIG. 15B
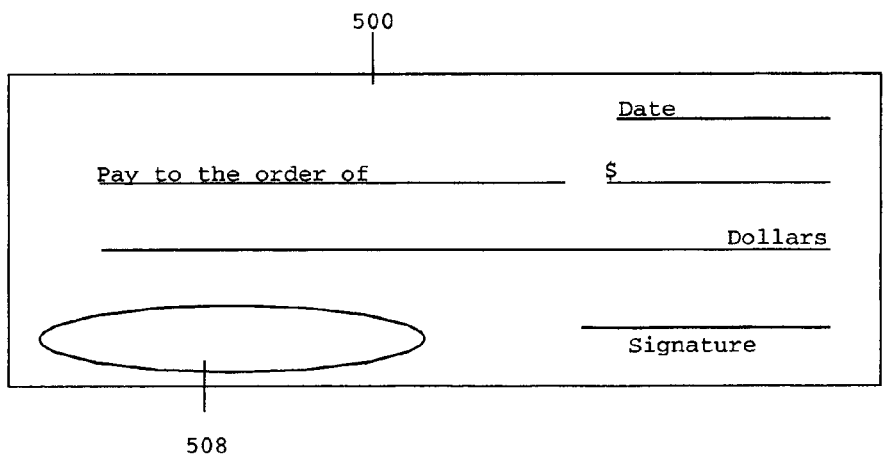
FIG. 15C
FIG. 15

DUAL TRANSACTION AUTHORIZATION SYSTEM AND METHOD

CROSS-REFERENCES TO RELATED APPLICATION

This application claims the benefit of U.S. Provisional Application No. 60/166,837 filed Nov. 22, 1999, which is hereby incorporated by reference into this application.

BACKGROUND OF THE INVENTION

1. Field of Invention

This invention relates generally to a method and system for a merchant credit card authorization system and, more particularly, to a method and system for providing an Authorization agent that communicates with the rightful owner of the credit card for its approval before completing the transaction.

2. Description of the Related Art

The convenience of credit cards makes it natural for consumers to use their credit cards to buy goods and services through the Internet. On-line stores recognizing the convenience of credit cards have adapted their web pages to accept credit cards as a means for conducting business with their customers through the Internet. The use of credit cards insures that the On-line stores/Merchants will be paid for the goods and/or services they provide to their consumers. The convenience of the credit card; however, comes at a price. This is because the anonymous nature of the Internet enables just about anyone with the credit card number and the expiration date to make unauthorized use of the credit card over the Internet. Moreover, the unauthorized user can be located anywhere in the world and use the credit card so that it is very difficult to prevent or detect the fraud.

Still further, another type of credit card fraud is the theft or cloning of the credit cards. For example, many merchants do not ask for identification when a credit card is used; and many automated systems, such as gas station pumps, allow anyone who posses the credit card to use it; such autonomy has led to fraudulent use of the credit cards at the expense of the merchants, credit card companies and consumers. In other words, current methods do not provide a means for checking that the user of the credit card is the rightful owner or someone who has been authorized to use the credit card. Although many On-line stores send a confirming email after a purchase, it is hardly a barrier to stopping fraudulent use of a credit card. One reason is that the unauthorized user can input any email address to send the confirmation, so that the owner of the credit card will never see it to do anything about it. Second, even if by chance the owner of the credit card did receive the confirmation email, it is after the fact and, therefore the fraud has already been committed. So anyone with the credit card number and the expiration date can log on to Priceline.com™ and Amazon.com™, and make fraudulent purchases without anyone knowing about it, until it is too late.

Some credit card companies have tried to deal with the above mention problems but not very well. For example, Citibank™ has instituted a program where a second credit card number is issued to a credit card holder. This number is tied to the consumer's credit account, but does not actually provide any fraud protection. Instead, the number is used to make purchases on the Internet just as the original credit card number. The consumer's Internet purchases are reported separate from his non-Internet purchases.

A similar approach is offered by American Express™, it pledges that, if someone other than the cardholder makes Internet purchases, the card hold will not be held responsible. Advertised under, "Blue" smarter credit card, this pledge is just that, a promise to the consumers that they will not be held responsible, provided the consumers were not negligent.

Visa™ offers parents the option of getting credit cards for their kids with a set limit that can not be exceeded. These cards then send email reports back to the parents of what the kids have purchased. A hard copy is also mailed at the end of each pay cycle. Again, like Citibank, this does not stop fraud.

Discover Card™ has instituted another reporting system using email. They send their cardholders a notice once their limit has been reached. A similar report is sent at the end of the billing cycle via regular postal mail.

Unfortunately, the above methods implemented by the credit card companies are inadequate to stop fraudulent use of the credit cards. Therefore, there still is a need to provide a method and system that can effectively prevent the fraudulent use of credit cards. Moreover, providing such protection with the convenience the credit card holders have enjoyed.

Another problem with the Internet is that it is not possible to determine whether an Internet user is lying about its identity on the Internet or not. Because the Internet user can be anonymous, there is great need for web sites to be able to confirm the sex and age of user.

SUMMARY OF THE INVENTION

A general object of the present invention is to provide a dual authorizing system and method to prevent fraudulent use of credit cards. To do so, in one embodiment the owner of the credit card is involved in the authorization process through a secure communication route to prevent fraud. A third party verifier is provided to ensure that the rightful owner of the credit card (hereinafter owner) approves of the transaction before the purchase is completed between the merchant and the credit card user. This is accomplished by linking the owner's Internet address or addresses to the credit card number (card), and storing this information with the third party verifier, such as an Authorization agent. Once the card is used to make a purchase, the Authorization agent is notified of the purchase. The Authorization agent then pulls the corresponding Internet address for the credit card number, then sends an approval request message to the owner at the owner's Internet address. This way, only the owner who had previously registered the credit card number with the Authorization agent is notified of the pending purchase and can approve or deny the purchase and, thereby preventing unauthorized user from making the purchase using the owner's credit card.

In one embodiment of the present invention, the credit card owner may provide its Internet address to the credit card Company, card-issuing bank, third party or other Authorization agent. The credit card number may be a new number or one previously registered to the owner. Moreover, the card may be used through the Internet or one that can be used on and/or off the Internet. More than one card number may be registered to the Internet address, and more than one Internet address can be linked to a given credit card number.

The registering process may be done in a similar manner as applying for any credit cards, i.e., providing personal data known only to the owner. Once registered, any changes to the Internet address or addresses linked to the card number(s) may require the owner to answer serious of questions that should be known only to the owner, for security purposes. This way, a person in possession of the credit card number, PIN, expiration date, and even his address, phone number, and Internet address can not change the linked Internet address. Thus, once registered, only the owner can change the link to the Internet address. The Authorization agent securely stores this information and is securely stored within the Authorization agent. For convenience, the owner may not need to provide the password to the Authorization agent to enter the Internet account. For example, the credit card number 5555 0005 5555 5555 could be linked to the owner's Internet address abcd@aol.com, but would not provided the owner's password ABRACADABRA.

In another embodiment, the credit card may be tied to any communication device, such as a phone number, other communication ID locator number, code for a cell-phone, Sprint PCS, AT&T PCS phone, any other personal communication device that provides phone service, Internet service, wireless data service, data communication device, video-phone service, and any combination thereof. Collectively, any device that acts as a wireless communication device, whether it provides voice, Internet, video, or any combination of these abilities will be referred to collectively as a Personal Communicator.

A credit card whose number is linked to the card holders Internet address and linked or tied to Internet devices is generally referred to from here on as an Internet-Credit-Card and its number as an Internet-Credit-Card Number.

When a consumer makes a purchase over the Internet using the Internet-Credit Card, the merchant makes an authorization request as it would do with any other credit card. When the Authorization agent receives the authorization request from the merchant, it checks the consumer's credit as it would do with any other credit card number. But before it issues an approval code (assuming there is sufficient credit), it sends out a Consumer authorization request to the consumer over the Internet via the Internet address or addresses linked to the Internet-Credit Card Number. This request is received by the consumer and in one embodiment, is processed by a piece of authorization software, which processes the consumer authorization request and prompts the user for approval or rejection. If the consumer has made the purchase, the consumer indicates his approval. The Authorization agent gets the approval code and then completes the merchant's approval request, by sending a merchant approval code to the merchant. The entire process takes a few seconds or less, but prevents the fraudulent use of credit card purchases.

The user's Internet address is a unique identifier. Should an unauthorized user obtain access to the credit card holder's Internet-Credit Card Number, the expiration date, PIN number, and the consumer's Internet address, the unauthorized user still could not make a purchase because the purchase must be made by entering the net as the owner of the card, which requires the owner's Internet access password. This system works regardless of how one logs onto the net, whether it be by standard modem, T1 connection, DSL, ISDN, cable modem, or any other method. As long as the owner does not provide its password to someone else, the Internet-Credit Card Number cannot be used to make fraudulent purchases. Should someone gain access to one of the owner's Internet accounts, the system may also include extra features, such as a software identification code that would be unique to each owner's authorization software. Thus when the Authorization agent contacts the consumer, if the authorization software did not possess this unique identification code, the Internet-Credit Card Number could not be used. This means that the unauthorized user would have to also have access to the owner's authorization software that is housed in owner's computer. Other safety features may be incorporated into the present invention, such as extra password codes that the owner has the option of setting on its authorization software, so that even if the software is stolen, it could not be used. This way, the owner becomes part of the authentication process.

The above described and many other features and attendant advantages of the present invention will become apparent from a consideration of the following detailed description when considered in conjunction with the accompanying drawings.

BRIEF DESCRIPTION OF THE DRAWINGS

Detailed description of the preferred embodiment of the invention will be made with reference to the accompanying drawings.

FIG. 10 is an exemplary Soft-card installed into a communication device;

FIG. 12 is an exemplary screen of a Soft-card displaying transactional information according to one embodiment of the present invention;

FIG. 15A is an exemplary check according to one embodiment of the present invention;

FIG. 15B is an exemplary check according to another embodiment of the present invention;

FIG. 15C is an exemplary check according to still another embodiment of the present invention;

DETAILED DESCRIPTION OF THE INVENTION

This description is not to be taken in a limiting sense, but is made merely for the purpose of illustrating the general principles of the invention. The section titles and overall organization of the present detailed description are for the purpose of convenience only and are not intended to limit the present invention.

Figure 2:
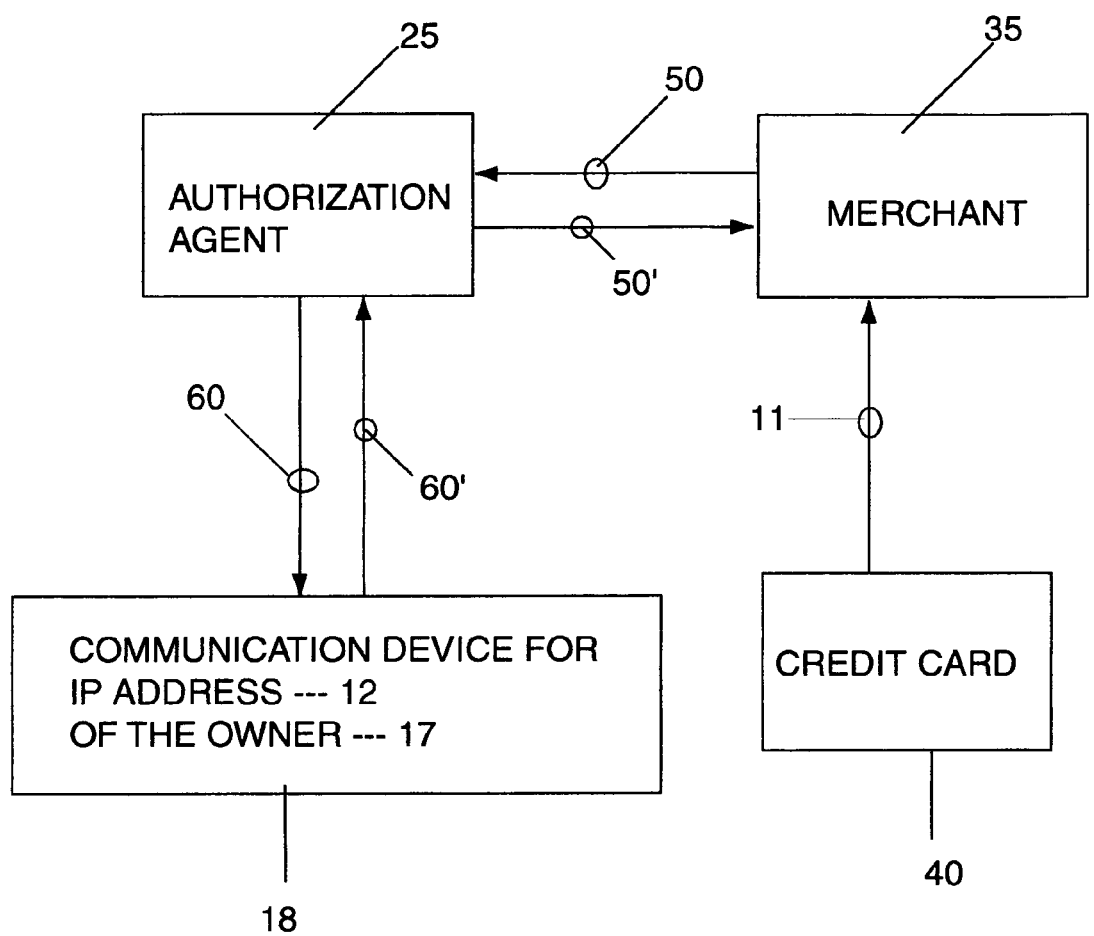
FIG. 2 is an exemplary block diagram illustrating authorization method and system according to one embodiment of the present invention.

As illustrated by way of example in FIG. 2, one aspect of the present invention is to prevent fraudulent use of a credit card through the Internet. To do so, a third party verifier is provided to ensure that the rightful owner of the credit card (hereinafter owner) approves of the transaction before the purchase is completed between the Internet merchant and the credit card user. This is accomplished by linking the owner's Internet address or addresses 12 to the credit card number 40 (card), and storing this information with the third party verifier, such as an Authorization agent 25, before using the card. Once the card is used to make a purchase, the Authorization agent is notified of the purchase, sends an approval request message to the owner at the owner's Internet address. This way, only the owner who had previously registered the credit card number with the Authorization agent can approve of the transaction.

Figure 1:
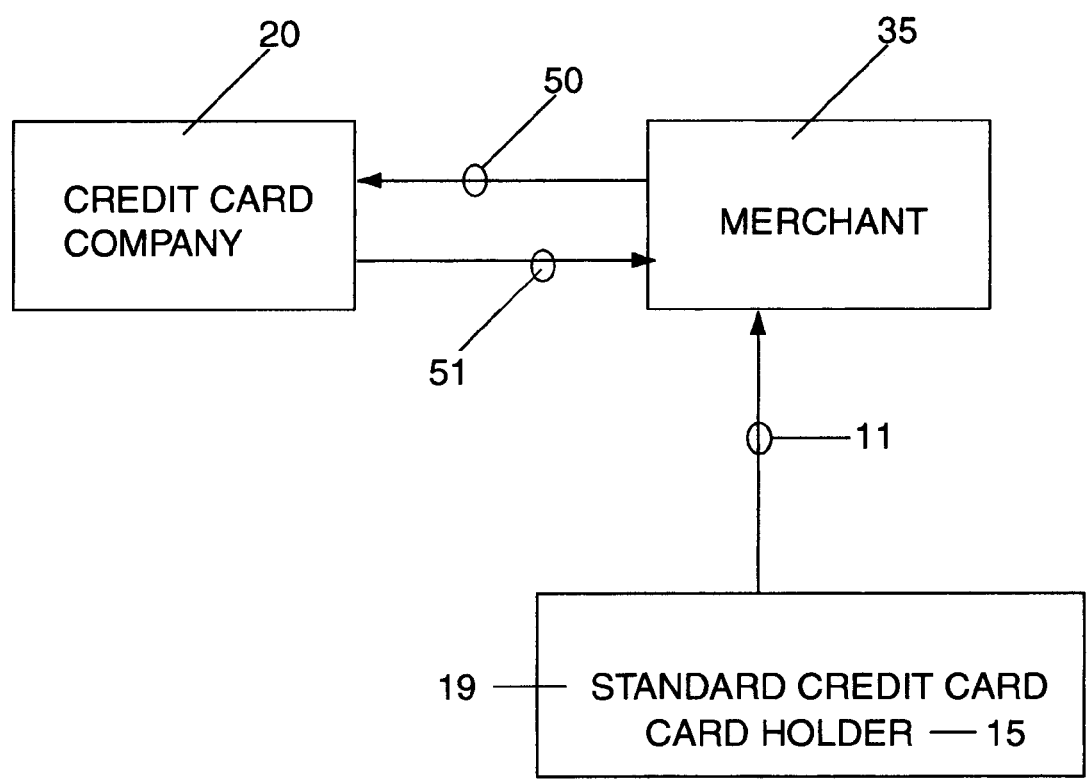
FIG. 1 is a block diagram of a prior art Internet commerce system.

As shown in FIG. 1, in the past, when a user/card holder 15 conducts a transaction through the Internet using a standard card 19, the Online store/business 35 sends a standard merchant authorization request 50 to the credit card company 20 for payment. If the standard card 19 is in good standing with the credit card company 20, then the credit card company approves of the request 50, by sending an approval code 51 back to the Online store/business 35. With the approval code 51, the Online store/business 35 then goes through with the transaction.

As illustrated by way of example in FIG. 2, with the present invention, however, when card 40 is used to conduct a transaction 11 with the merchant 35, the merchant authorization request 50 is not approved until the owner or its authorized user approves of the transaction. That is, to get an approval for the transaction, the Online store/business 35 sends the merchant authorization request 50 to the Authorization agent 25, then the Authorization agent 25 sends out a consumer authorization request 60 to the communication device 18 or Internet address 12 of the owner 17 that was previously registered with the Authorization agent 25. This way, only the owner and/or users who have access to the communication device 18 or Internet address 12 can approve of the request 60. Put differently, an unauthorized user of the card 40 can not approve of the transaction even if the unauthorized user had all of the pertinent information about the card 40 because the request 60 would be sent to the owner and not the unauthorized user. That is, in this embodiment, if the owner and/or its authorized user sends an approval 609 to the Authorization agent 25, then the Authorization agent 25 sends the merchant approval 509 back to the merchant 35 to approves the transaction 11.

As illustrated above, with the present invention, a transaction 11 using the card 40 is conducted securely by: (1) establishing a communication rout with the Authorization agent 25 to approve of the authorization request; and (2) where the communication is independent of the transaction itself. Put differently, having an independent communication rout established before the transaction means that even if an unauthorized user has pertinent information about the card 40, i.e., card number, date of expiration, etc., the unauthorized user can not approve of the transaction without knowing the communication rout where the authorization request 60 is being sent. Moreover, even if the unauthorized user knew the communication rout, this would not help without physically being at the site where the authorization request 60 is being sent to approve of the request. Of course, as further explained below, the present invention may used with E-signature (digital signature) as well to ensure that the E-signature is not being fraudulently used.

With regard to definitions, an "owner" generally describes a person who is the true owner of the credit card. A "user" generally describes a person who is using the credit card, i.e., this person may be the owner, a person authorized to used the credit card or a person who is fraudulently using the credit card.

Figure 3:
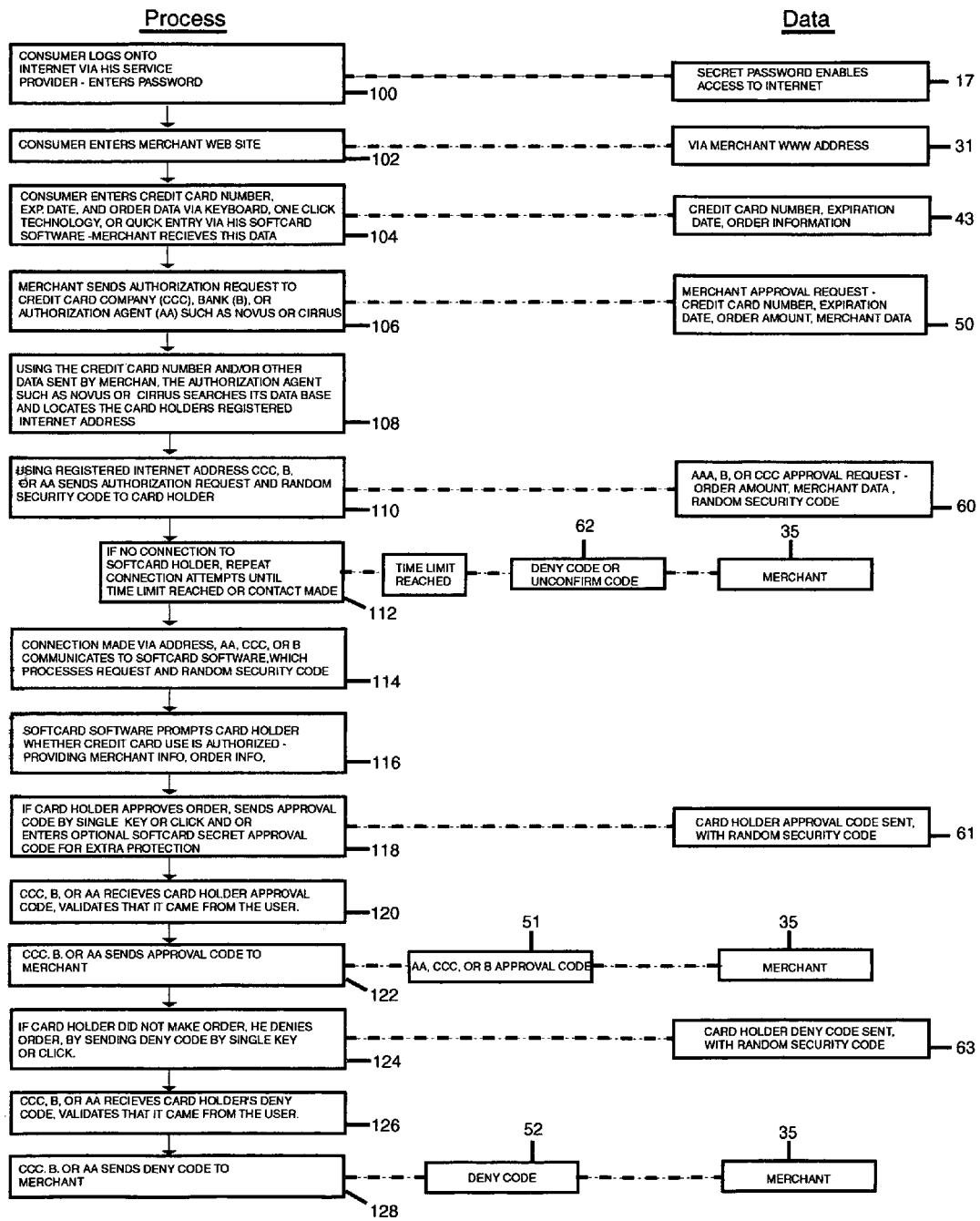
FIG. 3 is a flow chart illustrating a consumer-merchant authorizing credit card system according to one embodiment of the present invention.

As further illustrated by way of example in FIG. 3, the process of securely using the card 40 begins in step 100, as the user 15 logs on to the Internet. It should be noted that there are a variety of ways to access the Internet, i.e., through the online services like the American Online™ (AOL™). To access the Internet, the user 15 may use a server such as a Personal Computer (PC) 10 with a modem or modem like device. To gain access, however, the user generally needs to enter an identifier that is linked to the user's Internet address and its password. In the case of businesses and universities, a user may log onto a local network, which requires a login name and password. Such a network may have an open connection such as a T1 connection to the Internet 200. Regardless of the method used to connect to the Internet, user's address is generally connected to the user's login name and, as long as the user has a unique Internet e-mail account, the user has a unique Internet address 12, and it is this address that the owner of the card 40 registers with the Authorization agent 25. Put differently, while most service providers do not provide static/permanent IP address to each user, each user does have a unique internet address accessible only to the possessor of the login name and password.

In step 102, once connected to the Internet, the user may link to a merchant's web site by entering the merchant's IP address or the domain name 31. In step 104, the user may make a credit card purchase by entering the credit card information 43, which has been registered with the authorization agent 25. The credit card information 43 may include the credit card number 40 that is linked to user's Internet address 12 and the expiration date 41 of the card. Along with the credit card information 43, a purchase order information 42 is provided, which may include quantity, how, where and when to deliver the good or service. The credit card information 42 and purchase order information 42 are then sent to the merchant 35 via the merchant's modem connection 33. Note that the user, may enter the above information through a variety of means, such as a keyboard 11, One Click technology, cut and paste techniques, automatic entry features that could be built into a software in the user's computer, and/or remote to the user's computer. In order for the merchant's terminal (server, computer, etc) to communicate with the authorization agent 25, the merchant's terminal may be stored with the Authorization agent's Internet Address 21, or the address may be generated by the computer 10 and sent to merchant 35 with the consumer's purchase data 43.

In step 106, once the user has made a purchase by providing all of the purchase order information at the merchant's web site, the Merchant 35 process the data. One such process is to receive payment for the purchase by the user. To do so, the Merchant 35 sends a standard merchant approval request 50 to the appropriate Authorization agent 25. The standard merchant approval request 50 may include the consumer's credit card number 40, expiration date 41, merchant identifier 37, along with the purchase price of the product. The Merchant may communicate with the Authorization agent through the Internet or through a direct phone line. In other words, the Merchant 35 and the Authorization agent 25 may communicate through a variety of mediums known to one ordinarily skilled in the art. Moreover, communication medium that may be developed in the future may also be used.

In step 108, once the Authorization agent 25 receives the merchant approval request 50, the information contained in the request 50 is stored and processed. The Authorization agent 25 then performs a credit check for the owner's account and determines whether the account for the Internet-Credit Card account is active. If it is active, the corresponding Internet address 12 for the owner is retrieved, which has been previously registered with the Authorization agent 25. Alternatively, instead of the Internet address 12, the owner may register with the Authorization agent 25, a non-internet method of communicating with its communication device 18, for example, the owner may register the mobile phone number so that the owner can be reached through a mobile phone to approve of the transaction.

Moreover, in step 110, if the credit account meets the standard conditions for approval, such as sufficient credit in the account, the Authorization agent 25 sends an Authorization agent approval request 60 to the owner's Internet address 12. The request 60 may include the merchant's name, the purchase amount, product data, and date of purchase. The Authorization agent 25 then waits for a response from the owner to the request 60.

In step 112, if the authorization agent is unable to make a contact with the owner, i.e. not able to get through the IP address 12 or communication device 18, it may retry to make the contact; however, if preset designated amount of time has passed without a success, then the Authorization agent is unable to confirm the purchase code 62 to the Merchant 35. Alternatively, if the owner had a secondary Internet address 12', then the Authorization agent may try the secondary Internet address 12' once the designated time has passed for the primary Internet address 12. Still another alternative is to send the request 60 to both the primary 12 and secondary Internet address 12', in order to connect with the owner. More generally, any number of communication addresses can be assigned to the same credit card, limited only by the owner's preferences and the authorization companies policies. These addresses could all be contacted in any order, and could be done sequentially or in parallel.

In step 114, if the connection is made with the owner, an owner's Soft-card software 16 may optionally be used to process the authorizing request 60. In this embodiment, a Soft-card software may be generally defined as a software that may be installed into communication devices, such as a computer, cell phone, personal digital assistant, etc., to assist the owner or authorized users in responding to the request 60; to further enhance the secure use of the card 40; and using the card 40 easier through the Internet or net-enabled device such as cell phone, personal digital assistant. For example, Soft-card "SC" 400 may be included in the communication device.

Figure 4:
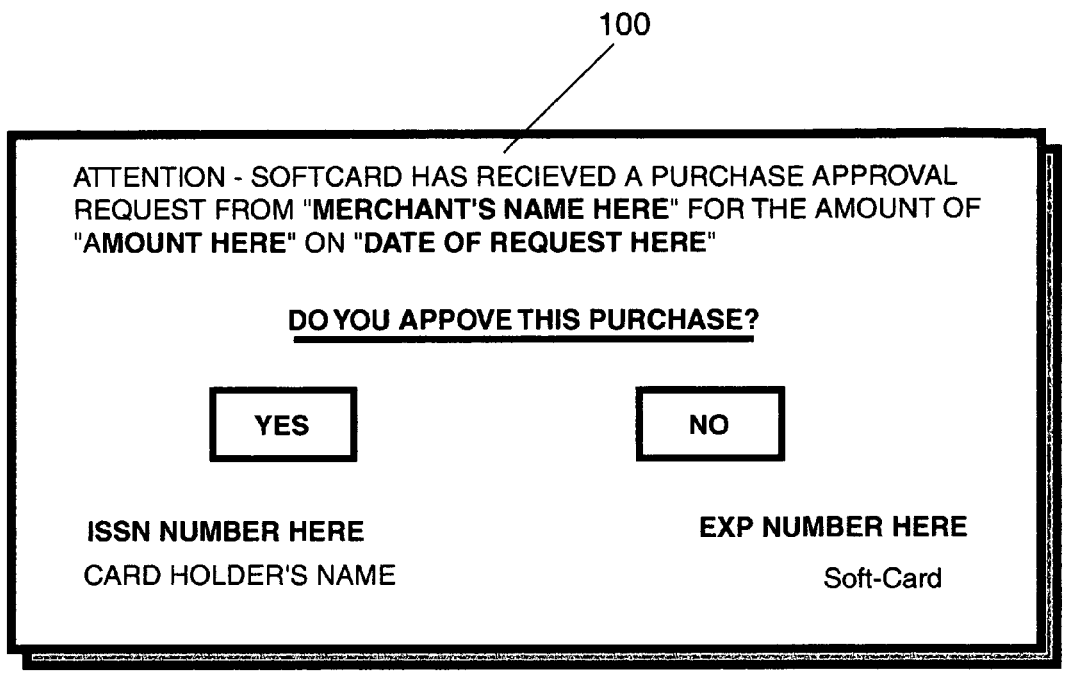
FIG. 4 is an exemplary Soft-Card software according to one embodiment of the present invention.

As illustrated by way of example in FIG. 4, to assist the owner of using the card 40, in step 116, the Soft-card software 16 may process the authorizing request 60 by prompting the owner for approval of the request 60 sent from the authorization agent 25. That is, the Soft-card software 16 transforms the request 60 into a prompt 100 that the owner can easily understand and reply to the request 60. For example, an exemplary prompt 100 may include such information as name of the Merchant, the transaction amount, and date and time of the transaction. Moreover, to respond, the owner can select either "YES" or "NO" to approve or disapprove of the request. The responses may be active buttons, which can be selected by clicking with a computer mouse or similar point and click computer devices.

Alternatively, instances where the owner does not have the Soft-card software 16 installed in the personal communication device where the authorization request 60 is sent, the authorization request 60 may be delivered as an email or an instant message, for example. In response to the email or the instant message may be not as convenient as responding to the prompt 100, as the owner may need to type in a response to the request 60, for example.

Figure 5:
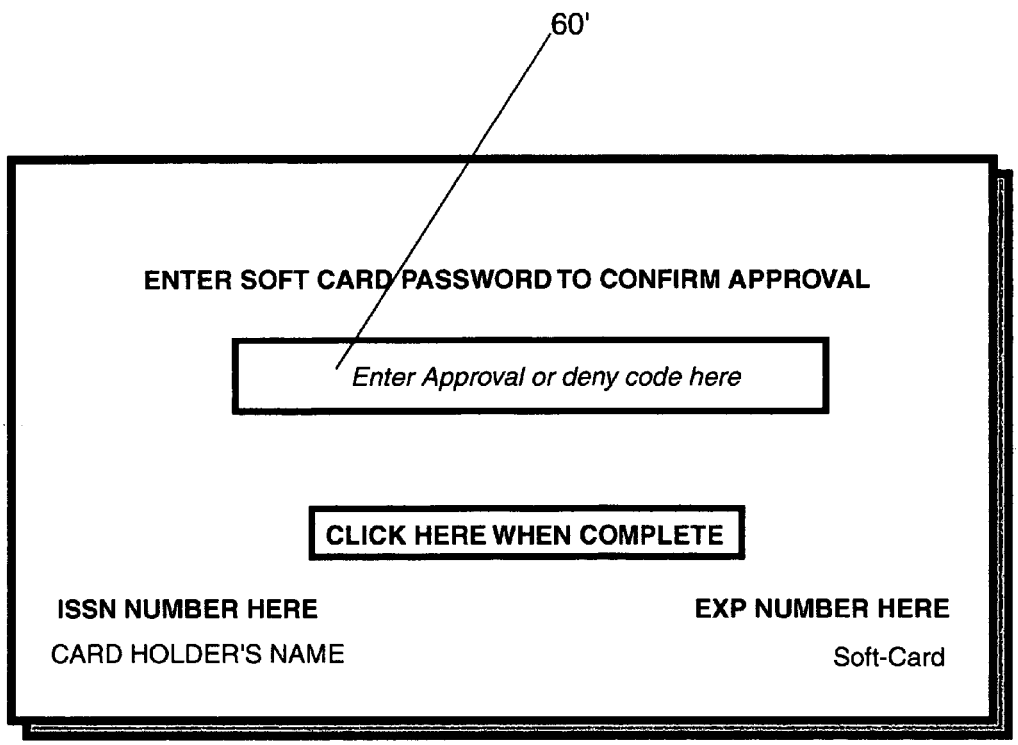
FIG. 5 is exemplary Soft-Card software according to another embodiment of the present invention.

As illustrated by way of example in FIG. 5, for additional layer of security, the Soft-card software 16 may include a request for an approval password. The approval password may comprise of an owner's approval code or deny code 60'. Once the code 60' is entered, the code is sent to the Authorization agent 25 via the Internet 200. The Authorization agent 25 then checks the code entry 60' to see if it matches with the corresponding owner's approval code stored within the Authorization agent, if the code does match, then the transaction is approved. On the other hand, if the code entry 60' matches the denial of the transaction, then the transaction is disapproved. Therefore, the Soft-card software having a request for an approval password further enhances the authentication process of using the card to make a purchase.

To further enhance the security, the Soft-card software 16 may also have its own identifier as an added level of security, so that the reply must not only come via the consumer's Internet address 12, but also specifically from the owner's Soft-card software 16. Added security here is that even if by chance an unauthorized user knows of the Internet address 12 or has intercepted the authorization request 60, the unauthorized user without the Soft-card software 16 installed in its computer, for example, can not approve of the request 60. Additional level of security may be added by using a very large password identifier, for example, it may be a five (5) million sting of numbers. Still further, this type of authorizing request 60 may contain a random security code/identifier that the Soft-card software attaches thereto in responses so that the Authorization agent's system 25 can be use to identify the consumers reply.

In step 118, if the owner sends an approval code 61 to the Authorization agent 25, and that approval code is determined to be authentic (step 120); and if the Authorization agent 25 has determined that the purchase meets other standard credit card purchase conditions, such as sufficient funds and an open account; then, in step 122, the Authorization agent 25 sends an approval code 51 to the Merchant 35. With the approval code 51, the Merchant 35 presents a receipt for the transaction and payment to the credit card user. The information on the receipt may include, the approval code 51, the Internet-Credit Card Number, the price, identification of the goods and date. For payment, the credit card company debits the owner's Internet-Credit Card number account for the purchase price and credits the Merchant's account. Without the approval code, however, payment is not made, so that mere possession of the Internet-Credit Card Number is useless for at least two reasons. One of the reasons is that the unauthorized users do not get the approval request 60 because the approval request 60 is sent to the Internet address belonging to the owner. Second reason is that the unauthorized users do not know the approval code 51, so that even if by chance an unauthorized user received the approval request 60, the unauthorized user can not approve of the request without the approval code 50. In other words, the present invention substantially prevents fraudulent use of the Internet-Credit Card Number.

On the other hand, in step 126, if the rightful credit card holder sends a deny response 63 to the Authorization agent 25, and that deny code is determined to be authentic (step 126), then, in step 128, the Authorization agent 25 sends a deny code 52 to the Merchant. Moreover, if no response is received at all, then the Authorization agent 25 may send a request for an approval again for a predetermined number of times to the Internet address, until the purchase can be verified. That is, if no response is received even after the predetermined number of times, then the deny code 52 is then sent to the Merchant. Alternatively, if the Authorization agent 25 has determined that the purchase does not meet other standard credit card purchase conditions, such as an insufficient fund, frozen and/or closed account, then the deny code 52 may be sent to the Merchant as well.

The exemplary process described in FIG. 3, i.e., from sending the standard merchant approval request 50, and the Authorization agent 25 sending the approval code 51 or the deny code 52 may take a few seconds or less. In other words, there is not much delay, if at all, when incorporating the Authorization agent to the credit card purchasing transaction. Moreover, with the advancement of computer technology, the entire process can be still further automated, with the only human interaction being the consumer approval or disapproval of the purchase. Accordingly, one feature of the present invention is to provide owner's interaction to substantially eliminate unauthorized use of the Internet-Credit Card Number.

Note that the communication device may be both mobile and static, i.e., the communication device may be a mobile device (wireless) like a PDA and cell phone, or a static device like a home computer. Moreover, besides the IP address, the authorization agent 25 may communicate through a channel that identifies the owner, such as the phone number of the owner or a radio device at a certain radio frequency. Still further, besides credit cards, the present invention may be used to authenticate E-signature as described below.

With regard to the computer 10 and the modem 14, they are not limited to any particular embodiments as described above. In other words, the computer and modem may be any device or combination of devices, including but not limited to Internet appliances, Palm Pilots and palm computers that can connect to the Internet. Moreover, the computer and modem may be new devices developed in the future that has its own data-net, i.e., a new type of Internet. The same is true for the Merchant's terminal 35 and the Authorization agent terminal 25, as well. In other words, the Merchant's terminal 35 and the Authorization agent terminal 25 may be any computer system, computer server, from simple personal computer to main frame computer systems and anything in-between, and a server that may be developed in the future. With regard to the Soft-card software, it can be any software that can process the approval request 50, including standard e-mail, instant message software, and other Internet communication software such as ICQ program available as shareware on the Net.

Still further, a user can use a communication device that is off of the Internet to approve the purchase. For example, a user might use a card that uses its cell-phone as the communication device for authentication. That is, a user makes a purchase on PRICELINE™, and the authorization request may be communicated by contacting the user through his cell phone or through the Internet if the a cell phone that has Internet capabilities. In another example, a user may use the user's card in a restaurant to pay for the meal. When the restaurant representative swipes the card through the reader, seeking approval as it is normally done, the Authorization agent, however in this case, sends out an approval request to the user's cellphone (an automated call). The user gets the call, approves the request by entering a pin (optional) number or selecting 1 for yes. The restaurant than gets the approval request, and the meal is paid for.

Figure 7:
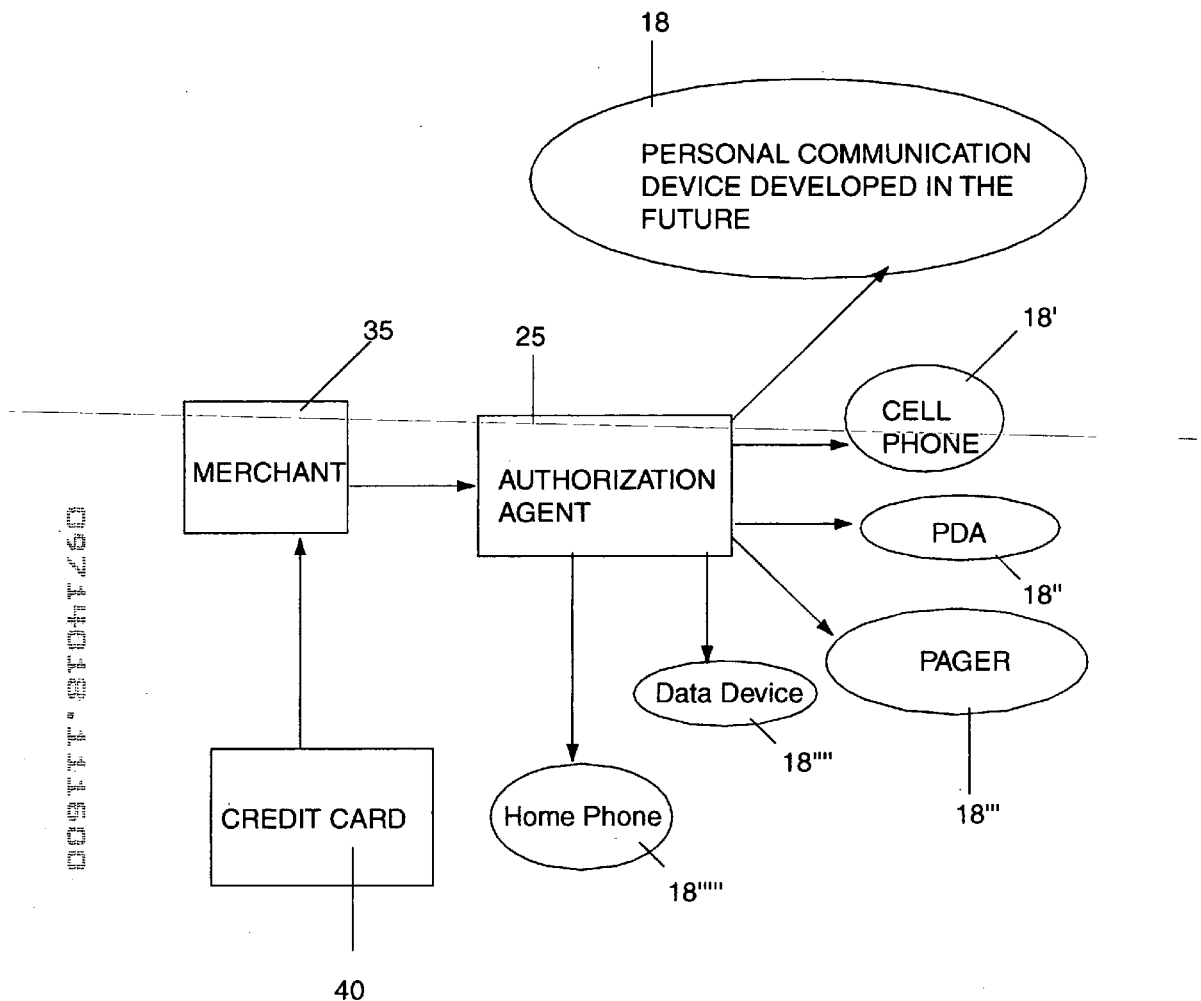
FIG. 7 is an exemplary block diagram illustrating authentication through a number of communication devices according to yet another alternative embodiment of the present invention.

As illustrated by way of example in FIG. 7, another embodiment of the present invention is to apply a duel authentication process for purchases and/or transactions made outside of the Internet. For example, in this embodiment, rather than linking the credit card to an Internet address, the credit card number may be linked to a personal communicator 18, such as a cellular phone 189 like Sprint PCS or AT&T PC, hand held computer, personal digital assistant 1899 such as a Palm Pilot, pagers 18999, data device 189999, home phone 1899999 and the like. In other words, when a purchase/transaction 301 is made using a card 40, the Authorization agent 25 contacts the owner through its personal communication device that was previously registered with the Authorization agent. Accordingly, as long as the owner is in possession of the personal communicator 18, only the owner can send a reply message with either an approval 61 or denial response 63. As before, the option of a PIN number can also be added to provide an additional level of security. Moreover, the personal communicator 18 may be used as an alternative route for communicating if the owner cannot be reached through the Internet address or if the owner prefers to be communicated to by a non-internet communication route.

Alternatively, the dual authorization process may be used by the owner to register a rapid communication address with the Authorization agent. This way, the Authorization agent can use the rapid communication address to communicate with the owner to authenticate the purchase. That is, the owner contacts the authorization agent that he wishes to designate a communication route. The authorizing agent then contacts the owner through the pre-registered communication route, for instance, a cell phone address or a PDA, and the owner then through that contact sets up a new or temporary address. For example, the owner may have a card tied to an Internet address but wants to authorize the use of the card when he is at the store. To do so, the owner requests to use the cell phone as a communication device 18 for the next 12 hours. To confirm the alternative rout, the authorizing agent contacts the owner through the Internet address to ensure that it was the owner who made the request, because anybody could send the request. In other words, the authorization agent obtains confirmation of the new rapid communication address that is good for the next 12 hours, or whatever length of time the owner sets. This way, the owner can permanently and/or temporarily change the communication channel with the authorization agent 25.

Still another alternative embodiment of the present invention is to use the dual authorization to communicate with the Authorization agent to pre-approve a purchase at the time that the merchant makes its approval request 50. This can be done through a variety of communication mediums, such as the Internet and/or personal communication devices. In other words, the owner sends an approval key code to the Authorization agent before the Merchant sends its approval request, or simultaneously as the Merchant sends its request. This way, the Authorization agent would immediately send the approval for the purchase. Still another alternative is to have the owner send in the correct purchase price to the Authorization agent simultaneously or before the Merchant sends in its request. Here, the Authorization agent may send the approval request 51 only if the purchase price sent in by the owner and the Merchant's requested purchase price matches, for example. In other words, in this alternative embodiment, the owner contacts the Authorization agent first, rather than the Authorization agent contacting the cardholder for its approval. Note that such a contact may need to be made through an approved and traceable communication route so that unauthorized user cannot make such a request. Still further, the Level of protection can be added by requiring that the user use a specific piece of software that is exclusive to the owner's computer. In addition, the software could be used to insure that the contact made via an Internet account is registered to the owner.

Figure 8:
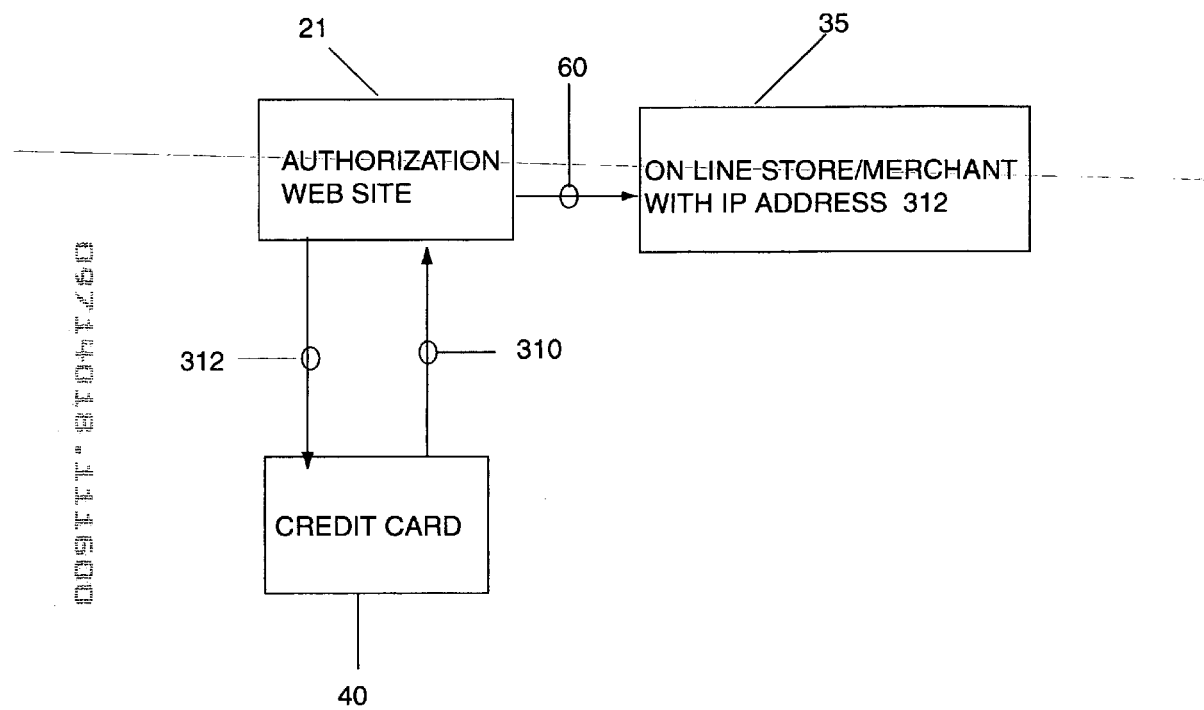
FIG. 8 is an exemplary block diagram illustrating still another alternative embodiment of the present invention.

As illustrated by way of example in FIG. 8, yet another embodiment of the present invention is to have an Authorization web site 21 where an owner can enter its PIN number or secret Pass-Code 310 to make a secured transaction and/or purchase using its card 40. Of course, if a user does not know the PIN number or inputs an incorrect PIN number, then the Authorization web site does not allow the user to make a purchase using the card 40. Once the user enters the correct password at the Authorization Web site, the user can then visit other Web sites either through the Authorization Web site's portal or directly to other web sites through standard web browsers.

In this embodiment, the dual authorization approval process may keep track of the websites the user is visiting after the user logs onto the authorization site. That is, in this embodiment, the user of the card can log on to the Internet from any account, i.e., user's AOL™ account, MSN™ account, school account, work account, a cyber-café account, public library, and etc. However, most of these accounts are not the communication route for the user's card. So in this embodiment, the user logs onto to the authorization website and enters his pin number. The authorization site then recognizes the IP address that the user is at, and where to send authorization request to. Moreover, the authorization site keeps track that the user is still logged onto this account, so that if the user logs out, no one else will get the authorization request at that account. And as discussed above, the cardholder can approve or disapprove of the purchase as described in FIGS. 2 and 3. The security in this embodiment comes from the fact that the owner has to first login to the Authorization web site 21 and provide the PIN number and/or secret Pass-Code 310 before making a purchase through an Online store. In addition, an optional pin request can be made each time an approval request is sent. That way, if the owner accidentally forgets to log off, someone else can not step in and approve the transaction. Moreover, the Authorization web site 21 may automatically log off the account after a predetermined amount of time so that an unauthorized user cannot conduct a transaction after the predetermined amount of time if the use forgets to log off of the account.

Still further, the Authorization web site 21 may send a cookie to track the user based on the Internet address used when the user enter the passcode. By way of background, cookies may be generally defined as bits of data put on a hard disk when a user visits certain Web sites. The most common use of this data is to make it easier for users to use Web sites that require a user name and password. That is, the cookie on the hard disk has the username and password in it, so that users do not have to log in to every page that requires that information. Moreover, cookies can contain virtually any kind of information, such as the last time a user visited the site, the person's favorite sites. And cookies can be used to track users as they go through a Web site and to help gain statistics about what kind of pages people like to visit.

Figure 17:
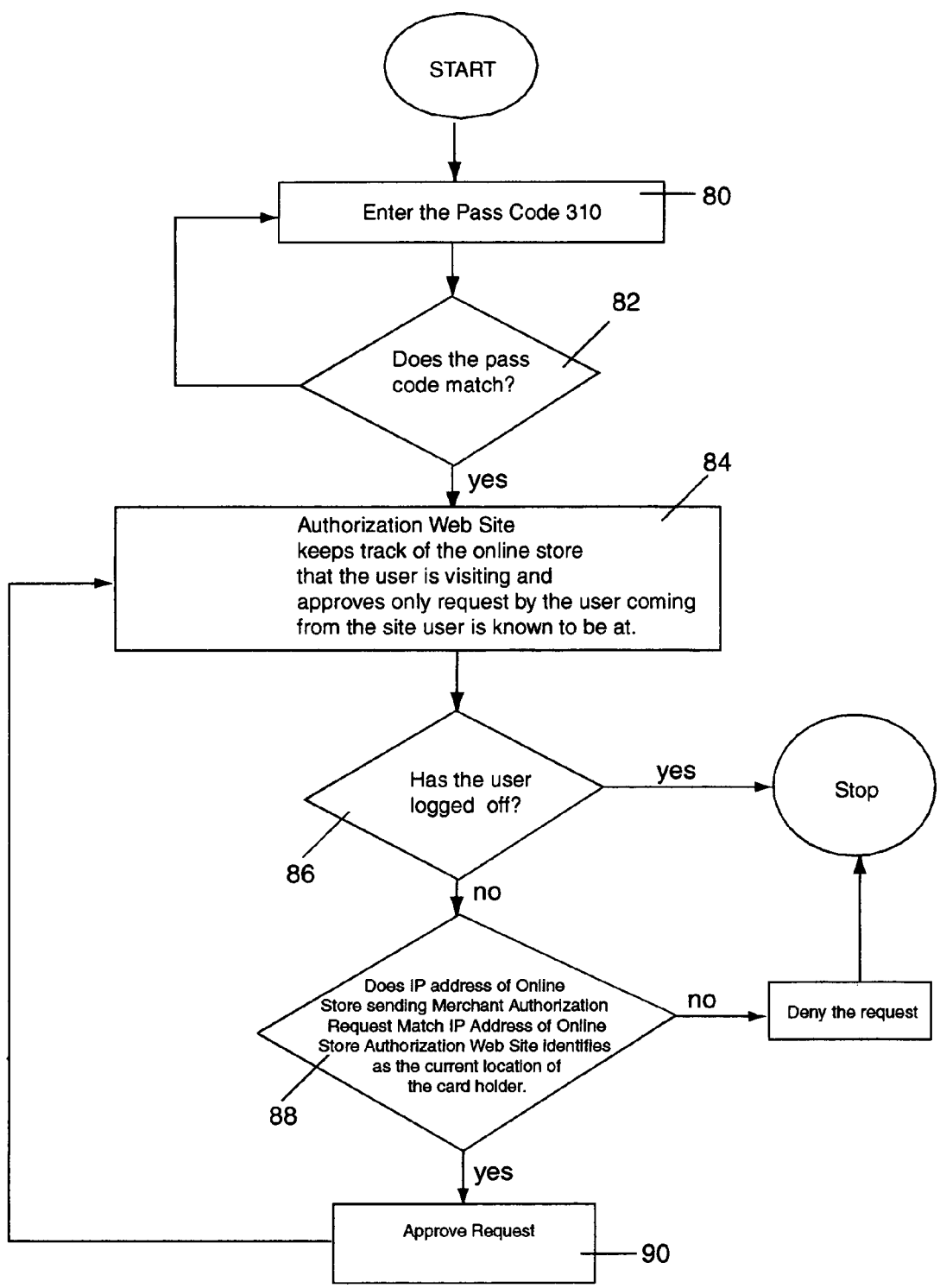
FIG. 17 is an exemplary flow chart illustrating an automatic approval process according to one embodiment of the present invention.

As illustrated by way of example in FIG. 17, still another alternative embodiment of the present invention is to have the Authorization Web site 21 automatically approve of the merchant authorization request 50, without the owner's interaction. To do so, in steps 80 and 82, once the user has logged onto the Authorization Web site and has entered the correct PIN number and/or Pass-Code 310, in step 84, the Authorization Web site keeps track of the Internet addresses of the Online stores the owner is surfing through, i.e. the Authorization Web site keeps track of the most current Web site(s) to which the cardholder is connected. Moreover, in step 86, the Authorization Web site monitors the user's activity to check to see if the user is online. If the user logs off, then the Authorization Web site may not automatically authorize the Merchant request 50.

On the other hand, if the user has remained online, and has made a purchase at an Online store, the Online store sends an authorization request 50 to the Authorization Web site. To approve of the purchase, in step 88, the Authorization Web site compares the Internet address of the Online store that sent in the merchant authorization request 50 with the Internet address(es) of the most current Web site or sites the owner is at, i.e., has or is visiting during this login period. Note that for users that are connected to the Internet for a long time or have always-on connections such as DSL, T1, etc., a time limit may be set so that the owner has to login again after the time limit. This way, an unauthorized user cannot order through the Online store after the time period.

In step 90, if the two Internet addresses match, then the Authorizing Web site may automatically send out an approval code 51 to the Online store to complete the purchase. This way, there is no need for the owner's interaction, as long as the user correctly provided the PIN number and/or Pass-Code 310 at the Authorization Web site. However, if the two IP addresses do not match, then the request 50 is denied because the rightful user could not make a purchase without being at the IP address of the Online store sending the request 50. That is, the security here comes from the fact that if the IP address of the Online store requesting the authorization request 50 is the same as the IP address of the Online store where the user is at, then it is highly likely that it is the rightful user making a purchase at that Online store.

Yet another alternative embodiment is to have the Authorization agent contact the owner for its approval from the Internet address from which the owner access the Authorization Web site 21. In other words, rather than the pre-registered address 12 being linked to the Internet Credit Card as described above, the Authorization agent/Web site uses the Internet address that the cardholder used to access the Internet Web site 21 and entered its pass-code. That is, the PIN number is used to determine the users present authenticated Internet address. Moreover, the Authorizing Web site keeps track of the cardholder via a program such as a cookie, to periodically check to determine whether the user is still logged onto the Internet. Should the user log off, the connection to the portal site is broken, as well as the Internet address. Thus, when the user logs off, others can not use the owner's credit card number to make a purchase. One of the advantages to this embodiment, for example, is that users may use any Internet account to enter and still get the authorization request from the Authorization agent/Web site, such as from a work internet account, a school internet account, a friend's internet account, a library internet account, etc. Note that the PIN number system disclosed in the present invention should not be confused with the PIN number used for Automatic Teller Machine (ATM), as the pass-code in the present invention is used to contact the user for its approval, among others. In yet another embodiment, the present invention may utilize both the PIN number system and predetermined Internet addresses, both of which must match before the purchase can be approved. This way, the protection against fraudulent use of the credit card may be maximized.

Still another embodiment is to use the duel authentication system for any secure transaction made over the Internet, such as E-signature. This includes contracts, the payment of bills, e-voting, identity confirmation, and the accessing of accounts and the trading of stocks. Currently these systems rely on pass-codes, which could be breached. With the present invention, an added level of security could be obtained by using an Authentication system similar to the one described in FIG. 2, where the access to these accounts, approval, the passage of contracts, or other classified material may be made via a third party Authorization system that contacts the owner. In this way, an unauthorized user knowing the pass-code alone cannot gain access or grant approval without the authorized personal approving the request from the Authentication system. For example, the present invention may be used for establishment of central E-signature verification systems.

Figure 9:
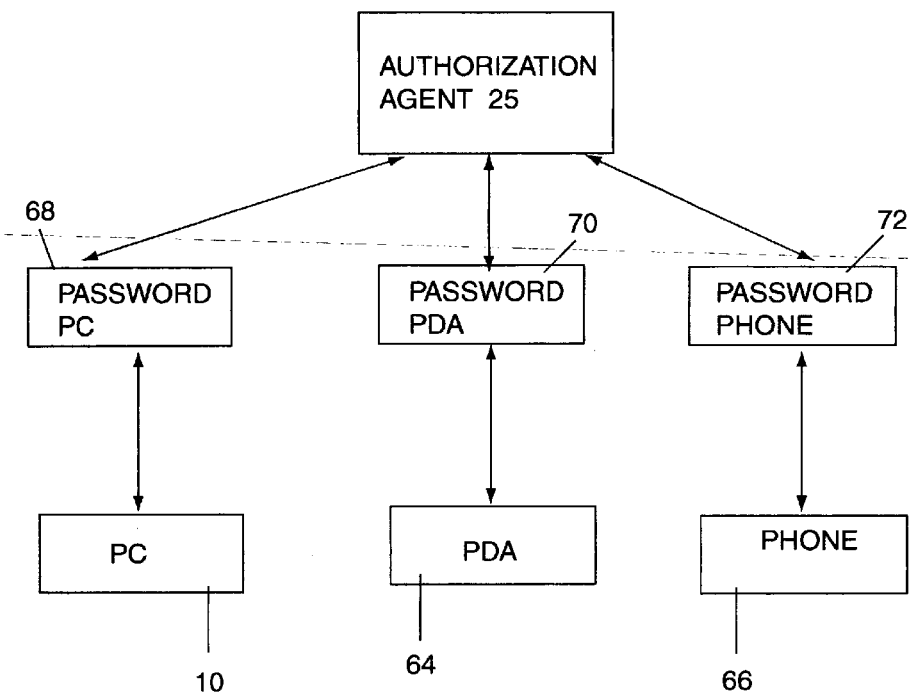
FIG. 9 is an exemplary block diagram illustrating using a password corresponding to a number of communication devices to communicate according to another embodiment of the present invention.

As illustrated by way of example in FIG. 9, the owner may set a plurality of communication routs associated with the card 40. For example, the owner of the card 40 may pre-register with the authorization agent 25, a number of personal communication devices 18 such as a PC 10, personal directory assistant (PDA) 64, and phone 66, each with its own communication rout. Moreover, each communication rout may be set up with a password, such as a password PC 68, password PDA 70, and password phone 72, for its respective devices. This way, the owner or the authorized user may use the password to indicate to the authorization agent 25, which communication rout or routs to use when sending the authorization request 60. As an example, if the owner is in an area where a signal is bad for a mobile phone 66 but good for the PDA 64, and does not want the authorization to be sent to the PC 10, the owner can used the password PC 68 and password phone 72 to de-activate the communication routs for the PC 10 and phone 66, respectively; and used the password PDA 70 to activate the communication rout for the PDA 64. In other words, when a transaction is made using the card 40, the authorization request 60 is sent only to the PDA 64, but not the PC 10 and phone 66.

Alternatively, in FIG. 9, the passwords for each of the devices may be used to nullify the authorization request 60. That is, if the owner or the authorized user is in a remote area where communication through the PC 10, PDA 64, and phone 66 is not possible, then the owner can use the passwords to nullify the authorization request 60 to each of the devices, i.e. PC 10, PDA 64 and phone 66, so that the card 40 now acts as a regular credit card so that the owner can use the card without having to approve of the authorization request 60.

Another alternative with regard to the embodiment illustrated in FIG. 9 is to let the authorization agent 25 know that the owner or authorized users may use the card 40 within some predetermined time, predetermined area, and/or within some predetermined price to make a transaction, for example. This way, if the owner conducts a transaction within the predetermined parameters set forth above, the authorization agent 25 may approve of the transaction without having to send an authorization request 60 to the owner. This exemplary embodiment may work particularly well, for example, in situations where the owner can not technically receive the request 60 through electronic means.

Yet another alternative embodiment of the present invention is to have the authorization agent 25 automatically approve of transactions that are within a predetermined amount and within a predetermined frequency. For example, the owner based on her purchasing habits may know that she uses the card 40 for a lunch in most days around noon for less than about $25.00. Alternatively, the Authorization agent 25 may keep track of such purchasing habits of the owner, such as the lunch the owner has around noon in most days for about $25.00. The owner and/or authorization agent 25, recognizing such purchasing habits, may optionally offer the owner the choice of not having to approve of the transactions that fits within the predetermined parameters, which are determined based on the buying habits. In other words, the owner recognizing that she uses the card 40 for a lunch in most days, may request that the authorization agent 25 automatically approve of the transaction, if the transaction is around noon and it is under $25.00. Put differently, if the transaction meets the above parameters, the transaction is automatically approved, so that the card 40 in such transactions acts like a regular credit card.

Still further, the owner may authorize the authorization agent 25 to automatically pay for a predetermined number of deminimis transactions using the card 40 within a set period of time. For example, the owner may authorize the authorization agent 25 to automatically approve of no more than three (3) transactions under $20.00 within an hour. That is, if a user uses the card 40 to buy gas at a gas station for under $20.00, and if there were no more than two previous transactions under $20.00 within an hour, then the transaction for the gas may be automatically approved by the authorization agent 25. This way, even if an unauthorized user tries to make small purchases with the card 40, the user may purchase no more than $60.00 an hour, and if the unauthorized user tries to make its fourth transaction within an hour, the owner must approve of the transaction before the purchase can be completed. Thus, the illegal use would be quickly detected.

Alternatively, all of the above embodiments may be done through the Soft-card software 16. In other words, the Soft-card software 16 may be adapted so that it may be installed in the PC 10, PDA 64 and phone or mobile phone 66. For example, if the owner wants to, deactivate the authorization agent 25 so that the card 40 now acts as a regular card, the owner can select a prompt from the Soft-card software installed in any of the communication device 18, such as the mobile phone 66, and enter a password and send it to the authorization agent 25 for deactivation. Moreover, the Soft-card software 16 may be used to pre-authorize the use of the card 40 within some predetermined time, predetermined area, and within some predetermined price to make a transaction, for example. The Soft-card software 16 through a password scheme may be used to authorize transactions that are within a predetermined amount and within a predetermined frequency. Likewise, the Soft-card software 16 may be used to automatically approve for a predetermined number of deminimis transactions using the card 40 within a set period of time. The above features provided by the Soft-card software may be particularly useful when most of the personal communication devices, like the computer, are connected to the Internet at all times.

Figure 6A:
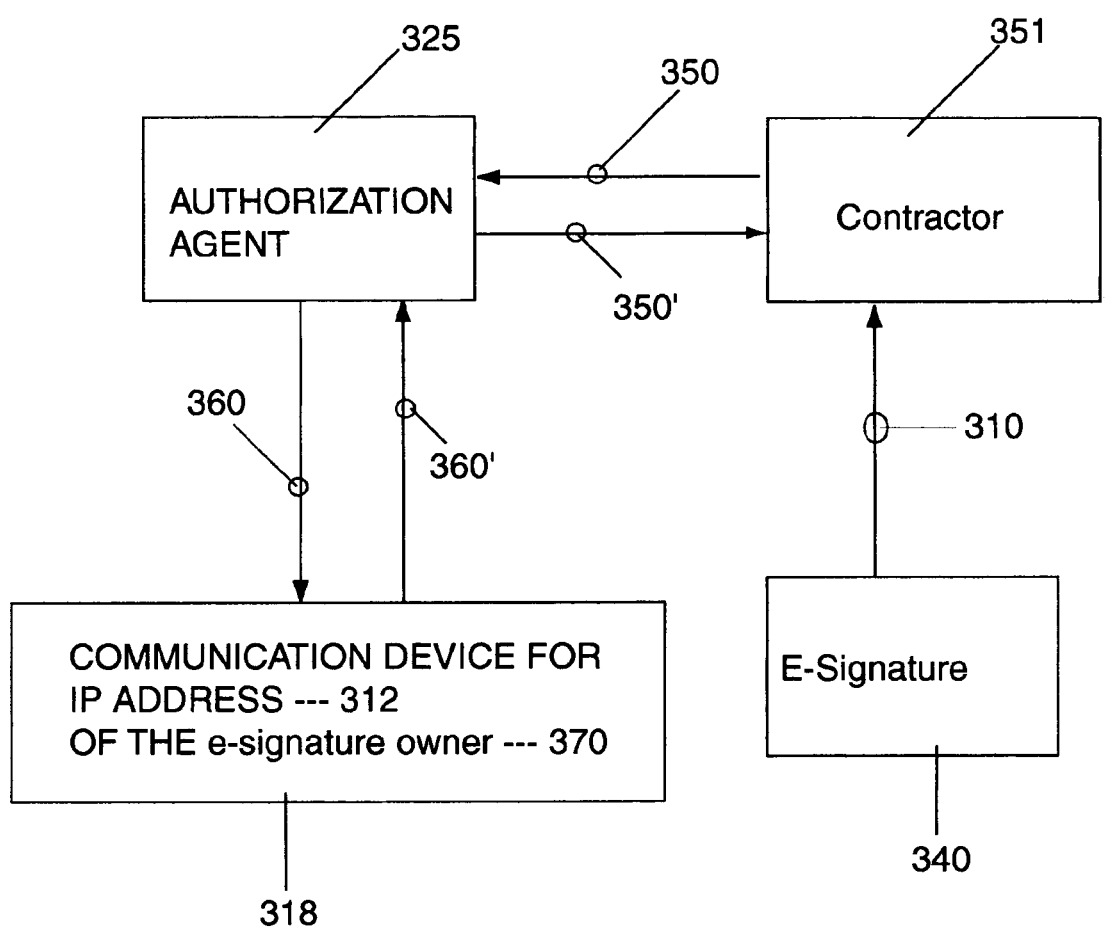
FIG. 6A is an exemplary block diagram illustrating authentication of an E-signature from a user according to yet another embodiment of the present invention.
Figure 6B:
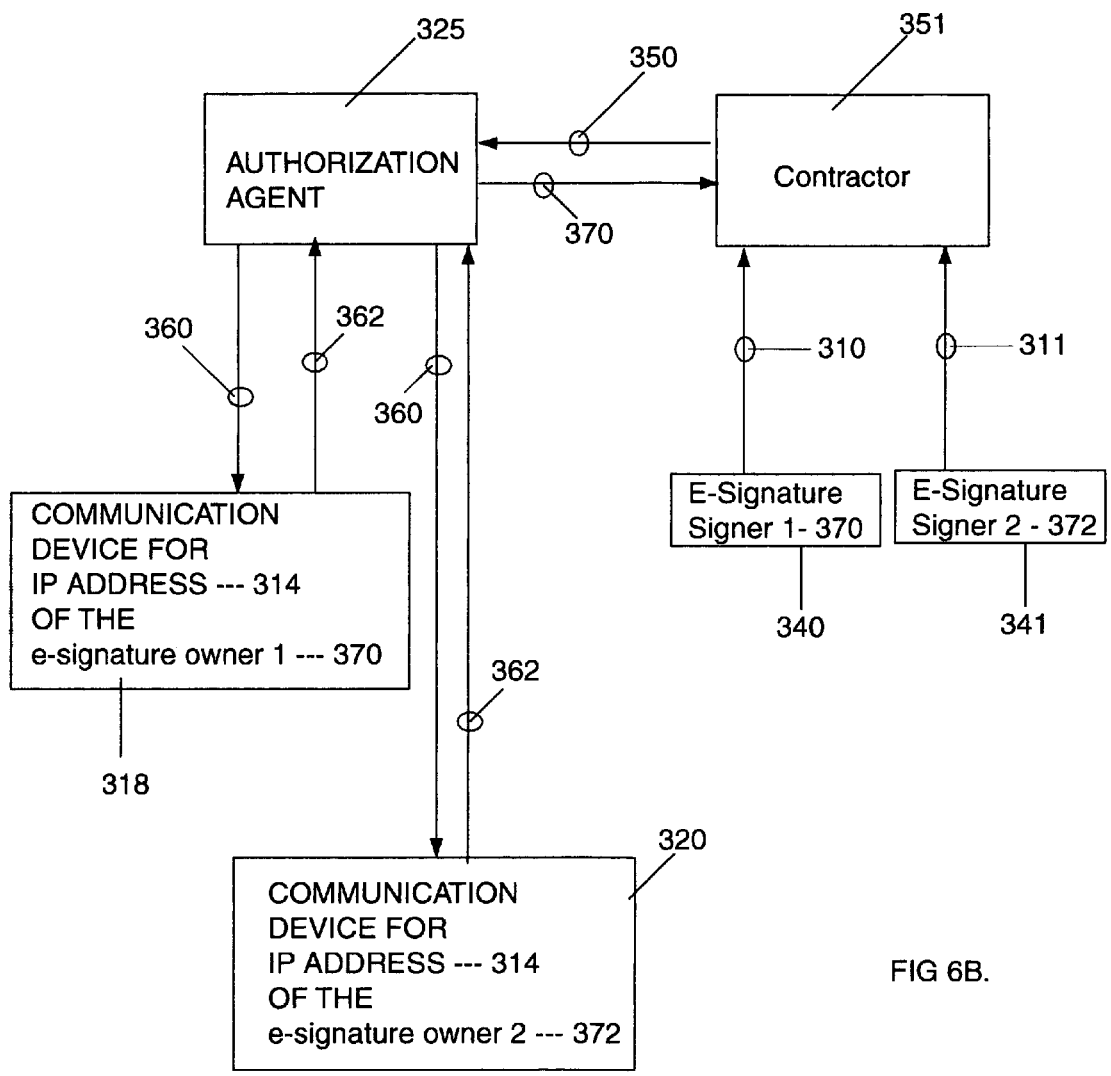
FIG. 6B is an exemplary block, diagram illustrating authentication of a plurality of E-signatures from users according to still another embodiment of the present invention.

As illustrated by way of example in FIGS. 6A and 6B, besides preventing fraudulent use of credit cards, the present invention may be used to authenticate E-signatures. By way of background, E-signature or digital signature is a digital code that can be attached to an electronically transmitted message that uniquely identifies the sender. Like a written signature, the purpose of an E-signature is to guarantee that the individual sending the message really is who he or she claims to be. E-signatures are especially important for electronic commerce and are a key component of most authentication schemes. To be effective, however, E-signatures must be unforgeable and cannot be stolen. With the present invention, the transaction is approved when the owner of the E-signature approves the transaction through a communication device for added security.

In this embodiment, when an E-signature 340 is used to conducted a transaction 310 with a contractor 351, the request 350 is not approved until the E-signature owner 370 or its authorized user approves of the transaction. That is, to get an approval for the transaction, the contractor 351 sends the authorization request 350 to the Authorization agent 325, then the Authorization agent 325 sends out an owner authorization request 360 to the communication device 318 or Internet address 312 of the owner 370 that was previously registered with the Authorization agent 325. This way, only the owner and/or users who have access to the communication device 318 or Internet address 312 can approve of the request 360. Put differently, an unauthorized user of the E-signature 340 can not approve of the transaction even if the unauthorized user had all of the pertinent information about the E-signature 340 because the request 360 would be sent to the owner of the E-signature not the unauthorized user. That is, in this embodiment, if the E-signature owner and/or its authorized user sends the approval 3609, and the Authorization agent 325 receives it, then the Authorization agent 325 sends approved authorization request 3509 to the contractor 351 to ensure that the owner 370 did in fact send the E-signature 340.

As further illustrated by way of example in FIG. 6B, the present invention may be used to verify E-signatures of two owners 370 and 372. In other words, the authorization agent 325 may be used to verify a plurality of E-signatures in instances where there are more than one parties involved in the transaction.

Figure 11:
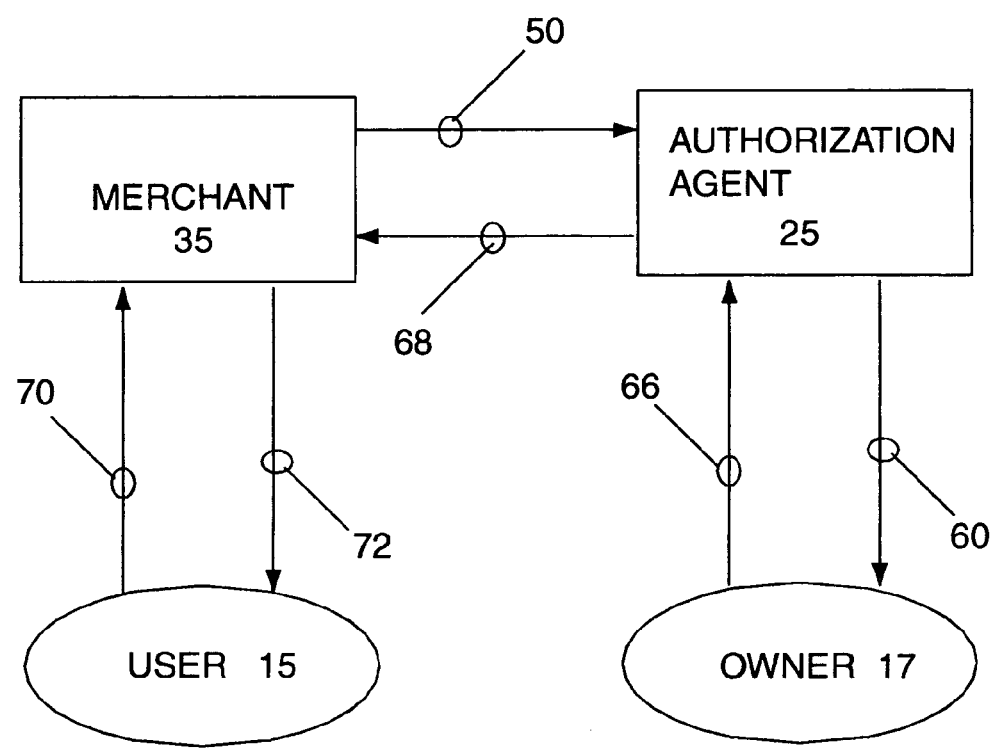
FIG. 11 is an exemplary block diagram illustrating yet another embodiment of the present invention.

As illustrated by way of example in FIG. 11, the present invention may be used to allow the owner 17 to approve of a transaction between the user 15 and the merchant 35. For instance, the user 15 may try to use the card 40 to purchase a product and/or service 70 from the merchant 35. As before, the merchant then sends the merchant authorization request 50 to the authorization agent 25. Thereafter, the authorization agent 25 sends out the consumer authorization request 60 to the Internet address 12 of the owner 17, rather than to the user 15. Moreover, the merchant authorization request 50 may include such information as the name listed on the card 50, purchase price, the item being purchased, where the item is being purchased and when; this information may be included in the consumer authorization request 60 as well. After receiving the authorization request 60, the owner 17 can then either approve of disapprove of the request 60, such decision may be made in part based on the above information provided along with the request 60.

Based on the information provided by the request 60 or in the prompt 102, if the Soft-card software is used, the owner 17 may send a response 66 to the authorization agent 25. If the owner 17 approves of the request 60 then the response 66 is sent with the approval code 61; on the other hand, if the request 60 is denied, then the response 66 is sent with the deny code 63. Once the authorization agent 25 receives the response 66, an agent response 68 is sent to the merchant 35. The agent response 68 may be either the approval code 51 or deny code 52 depending one whether the owner entered the approval code 61 or deny code 63, respectively. Then based on the response 68, the merchant 35 can let the user know of the merchant response 72, whether the owner 17 approved or disapproved the purchase of the product and/or service 70.

Figure 13:
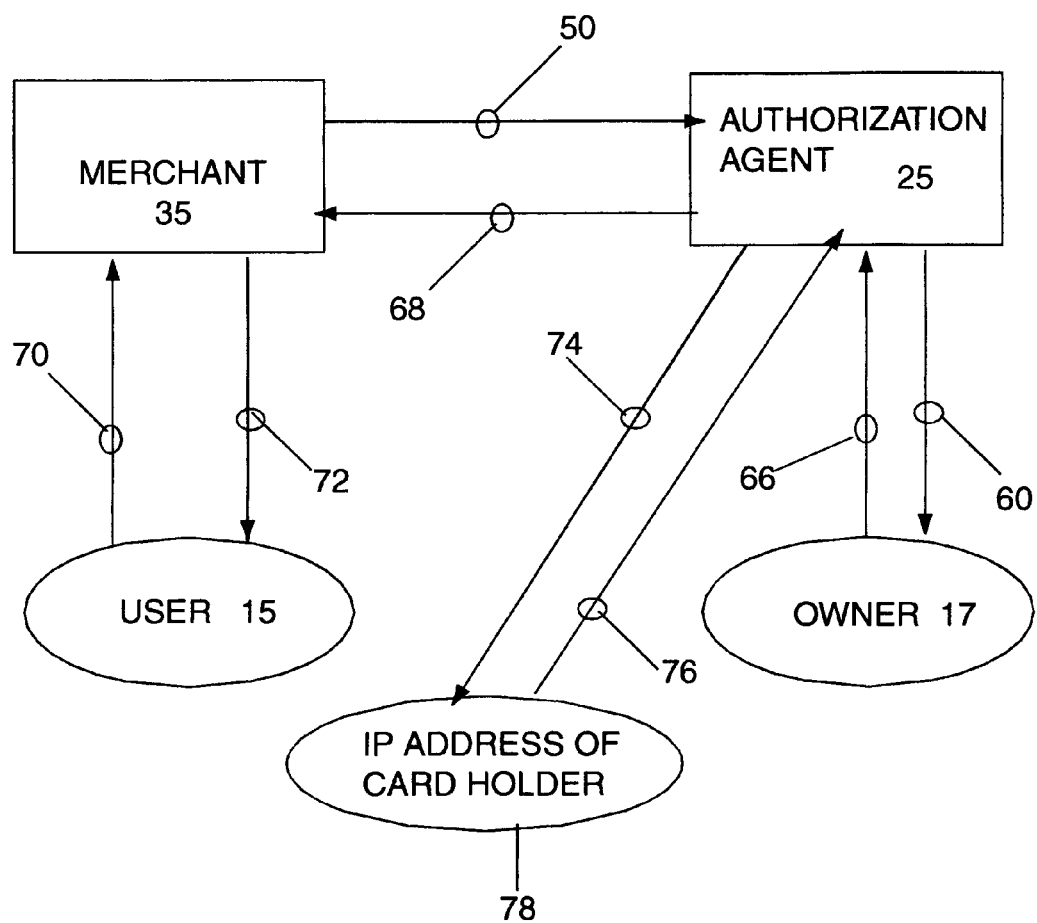
FIG. 13 is an exemplary block diagram illustrating added level of security according to still another embodiment of the present invention.

Alternatively, as illustrated by way of example in FIG. 13, added security may be incorporated into the above embodiment. Here, before sending the authorization request 60 to the owner 17, the authorization agent sends a notification 74 to the IP address of the card holder 78 that was registered with the authorization agent 25. If the card holder is in fact the user 15, then the card holder 78 sends back a response 76, that "yes" the authorized user is using the card 40. On the other hand, if the card holder is not using the card 40, then "no" response 76 is sent back to the authorization agent 25. If the response 76 is "no" then the authorization agent 25, as before, sends back a deny code 68 in the response 68 to the merchant 25. If the response 76 is "yes" then the authorization agent 25 sends the request 60 to the owner 17, for its approval as before. This way, there is added security that the user 15 is in fact authorized to use the card 40; and the owner 17 can approve or disapprove of the user's purchases.

Still further, as illustrated by way of example in FIG. 12, a Soft-card software 16 may be used to conveniently display the transaction information prompt 102 to the owner 17. For example, a parent (owner 17) can give its child (user 15) a card 40 for educational purposes while going to a college. That is, if the child uses the card 40 at the college book store to buy text books, binders for classes and clothes, then the parent would receive an authorization request 60 with the following optional information, such as: the person's name on the card 50, in this case, child's name; the place of transaction, in this case, the college book store; the purchase amount; the itemized cost, in this case, (1) books, (2) binders, and (3) clothes; (4) total amount; and the date and time of the purchase. With such information the parent recognizing that the child is purchasing items for school purposes would most likely approve of the transaction by selecting "yes."

Alternatively, the parent can selectively approve of the items, in other words, approve of the books and binders but not the clothes.

Figure 14:
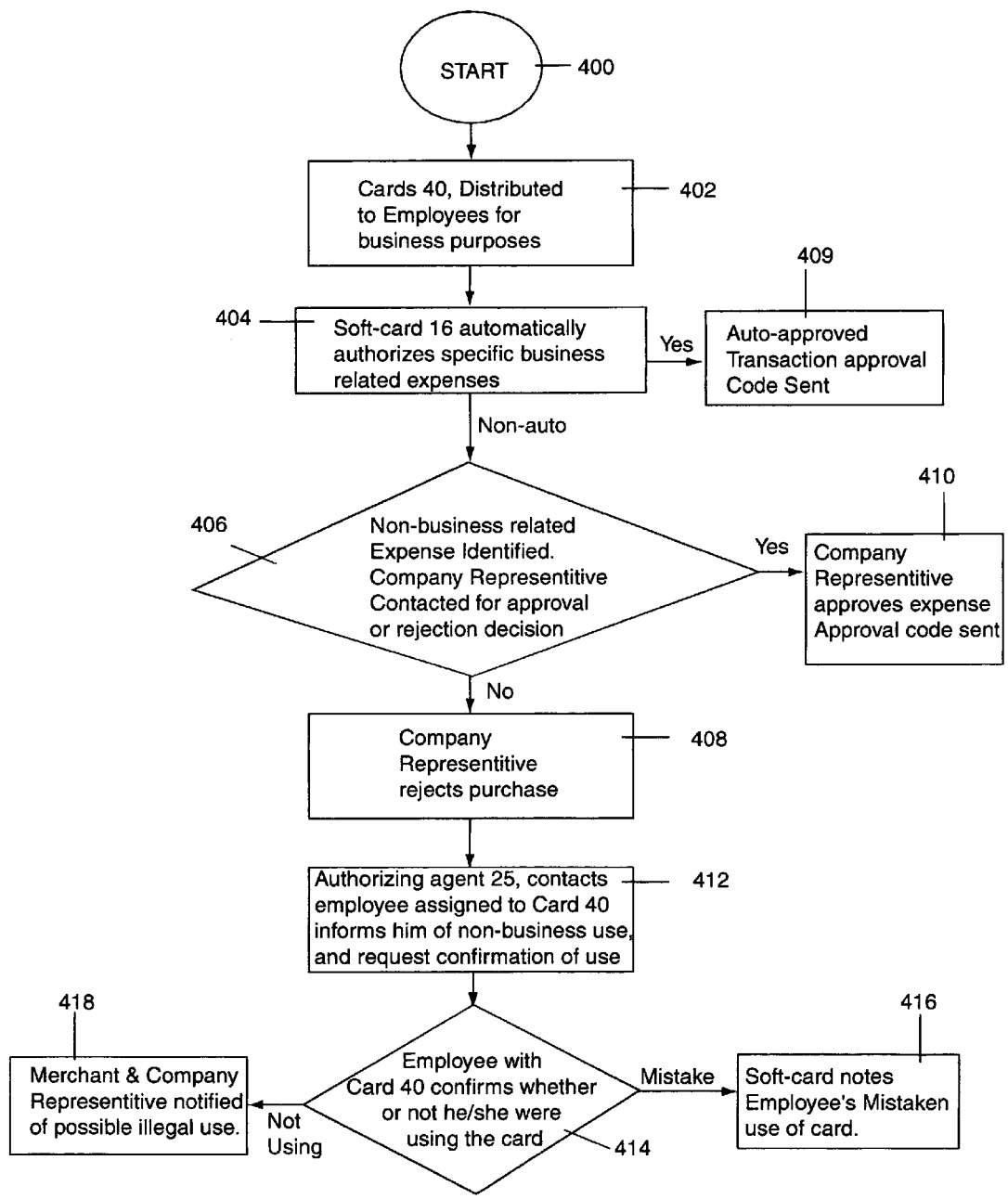
FIG. 14 is an exemplary flow chart illustrating yet another alternative embodiment of the present invention.

As illustrated by way of example in FIG. 14, yet another use for the above embodiments is to have a company give cards 40 to its executives or employees to use as a corporate card. For example, in step 402, the company may distribute the cards 40 to its employees with the understanding that the card 40 is to be used for business purpose only, in other words, for hotel commendations, flights, rental cars, entertainment, etc; but for personal purchases the employees should use their personal credit cards. To do so, in the optional step 404, the Soft-card software 16 may be programmed with a step 409 to automatically authorize transactions for specific business related expenses only, which have been communicated to the employees. Such automated system would free the company from manually approving or disapproving every authorization request 60. In step 406, should a user 15 try to use the card 40 for non-specified business related expense; in step 408, the Soft-card software 16 may notify the company representative of such use, as this may indicate that the user may not be an employee of the company who understands the policy behind the card 40. On the other hand, in step 410, if the user uses the card 40 for pre-specified purposes, then the Soft-card software 16 may automatically or company representative may approve of the request 60.

Moreover, in step 412, the authorization agent 25 may send a notice to the IP address of the employee assigned the card 40 that the card is being used for non-business related purpose; and whether the employee is using the card 40. At which time, in step 414, the employee may respond back that the employee is using the card 40 and that the employee made a mistake for using the card 40 for non-business related expense; or that the employee is not using the card 40, so perhaps the card 40 is being misused. In step 416, if the use of the card 40 was a mistake, then the Soft-card 16 may simply make a record of the fact that the employee mistakenly tried to use the card 40. In step 418, however, if the employee is not using the card 40, then the merchant 35 is notified that the user of the card 40 may be an unauthorized user and notify the proper authorities.

As an example, if the employee uses the card 40 to make a purchase at an electronic store to buy a radio, then the Soft-card software 16 may automatically deny the request 60 because it is not a business related expense and send a notice to the employee. In step 414, if the employee responds back that the employee is not currently using the card, nor has anyone else been authorized to used the card 40, then the Soft-card software 16 may notify the merchant and the proper authority that the card 40 may be used by an unauthorized user. Of course, the Soft-card software 16 may be programmed in the company's server or in the authorization agent's sever.

There are several advantages to the above embodiments, for one, the owner 17 or the company may control the types of purchases and/or transactions that may be made using the card 40, and substantially reduce the risk that the purchase is being made by an unauthorized user.

As illustrated by way of example in FIGS. 15A, 15B, and 15C yet another alternative embodiment of the present invention is to substantially prevent fraudulent use of checks. FIG. 15A shows the front side of an exemplary check 500 with the bar code 502. In this embodiment, the bar code 502 is used to link with the owner's IP address 12 and the information may be stored with the authorization agent 25, much like the credit card number 40. As such, when the user 15 tries to write a check 500 with the bar code 502, the check 500 may be scanned. As with the card 40, once the check is scanned, the authorization agent 25 is notified of the transaction, and sends a request 60 to the IP address 12 for approval, as before. This way, with the present invention, fraudulent use of the check 500 is substantially prevented, if not all.

Alternatively, FIG. 15B shows a check 504 with a magnetic strip 506 that may be coded and linked with the owner's IP address 12, as well. This way, the magnetic strip 506 may be coded and linked to the IP address 12 of the owner 17. When the check 504 is used, the magnetic strip 506 may be swiped though through a magnetic detection system and the authorization agent 25 is notified of the request to the aforementioned approval process.

Still further, as illustrated by way of example in FIG. 15C DIGIMARC™ 508 may be incorporated into the check 500. DIGIMARC™ may be generally described as a hidden mark that may be viewed from a digital camera. In this embodiment, the DIGIMARC™ may be linked to the authorization agent to send out the approval request.

Figure 16:
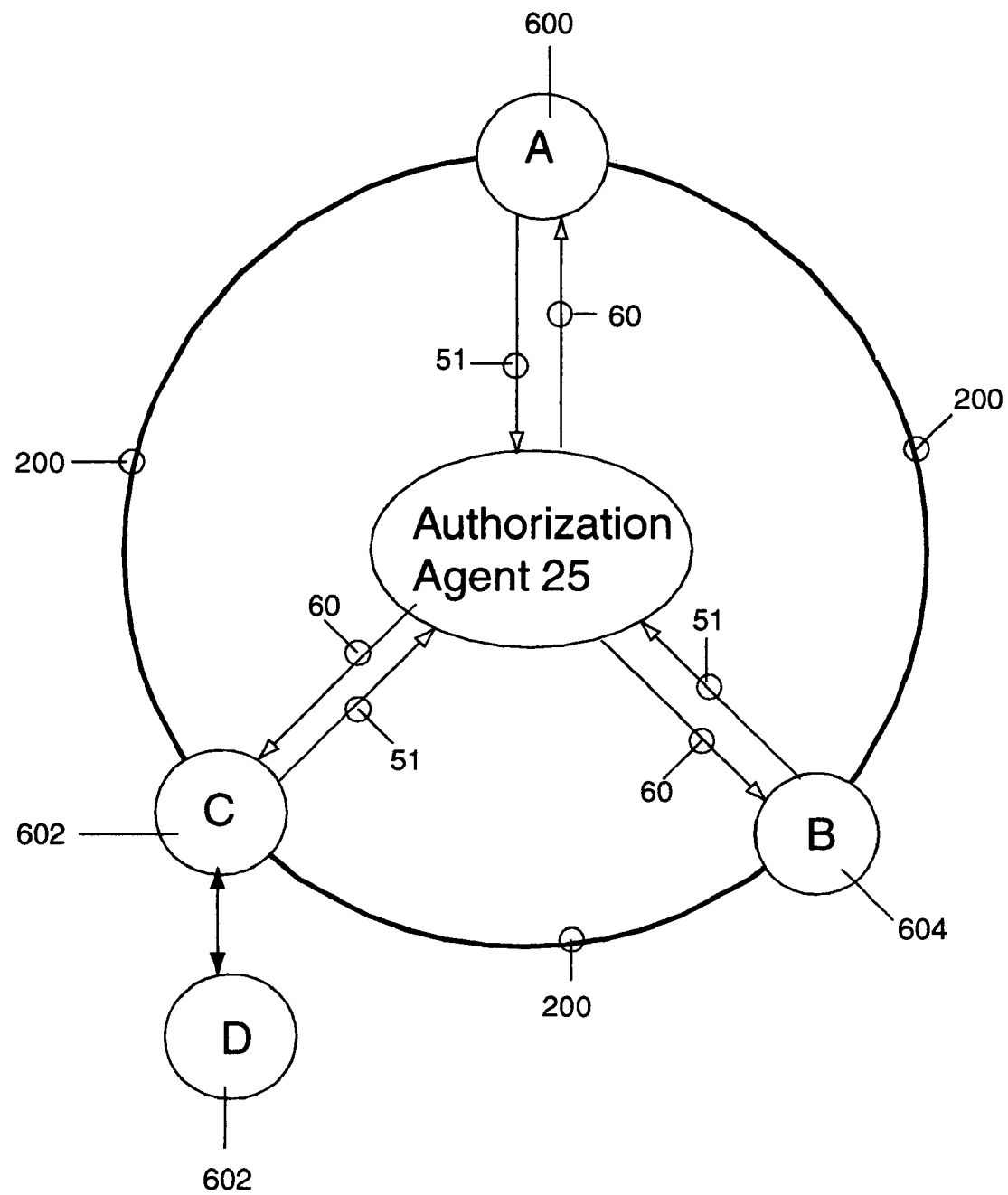
FIG. 16 is an exemplary block diagram illustrating authenticating a transaction involving a plurality of parties according to one embodiment of the present invention.

As illustrated by way of example in FIG. 16, another embodiment of the present invention is to have a plurality of users being able to authenticate a transaction. Alternatively, each party may register an E-signature tied to a communication rout through the verification process like that used for the card 40. For example, if parties A, B and C want to enter into an agreement, but want to be sure that they are dealing with the right people, the parties can pre-register an IP address or E-signature where they want the authorization request to be sent. For instance, party A may be in Hong Kong, party B may be in New York and Party C may in Los Angeles, and they may want to conduct the transaction electronically without having to meet to finalize the transaction. To do so, each party may register their respective E-signature with the Authorization agent 25, and its respective IP address to receive the authentication request 60. To finalize the deal, each party may remotely sign the agreement via an E-signature, for example, the parties A, B and C may have sign E-signatures 600, 602 and 604, respectively; and exchanged among each other through the Internet 200. But before the deal is completed, the authorization agent 25 sends out an authorization request 60 to the IP addresses of the parties to make sure that the parties are who they say they are. That is, the deal is approved when each of the parties respond with the approval code 51; otherwise, the authorization agent 25 does not approve of the deal.

With the above embodiment, a non-party like D, for example, can not pretend to be the party B, and agreed to the deal by simply having possession of party B's E-signature 602, that may have been stolen and/or who do not have the authority to agree to such a deal. On the other hand, with the present invention, party D, even if it had the E-signature of the party B, the party D could not approve of the transaction because the authorization request is sent to the IP address of the party B.

Moreover, although the above embodiments generally describe use of the credit card, other currency exchange means may be used with the present invention. More generally, the above embodiments can also be applied for identity confirmation over the internet, preventing fraudulent electronic voting over the internet, universal e-signature applications, and other currency exchange means may be used with the present invention. For example, the present invention may be used with a digital wallet. By way of background, a digital wallet may be generally described as encryption software that works like a physical wallet during electronic commerce transactions. A wallet can hold a user's payment information, a digital certificate to identify the user, and shipping information to speed transactions. The consumer benefits because his or her information is encrypted against piracy and because some wallets will automatically input shipping information at the merchant's site and will give the consumer the option of paying by digital cash or check. Merchants benefit by receiving protection against fraud. Most wallets reside on the user's PC, but recent versions, called "thin" wallets, are placed on the credit card issuer's server. Netscape and Microsoft now support wallet technology on their browsers. Future electronic wallets may be placed on a programmable credit-like card, that holds numerous credit card, and electronic. These will be useable on and off the internet. Authorization of these portable e-wallets will be needed to protect the consumer from massive fraud.

Figure 18A:
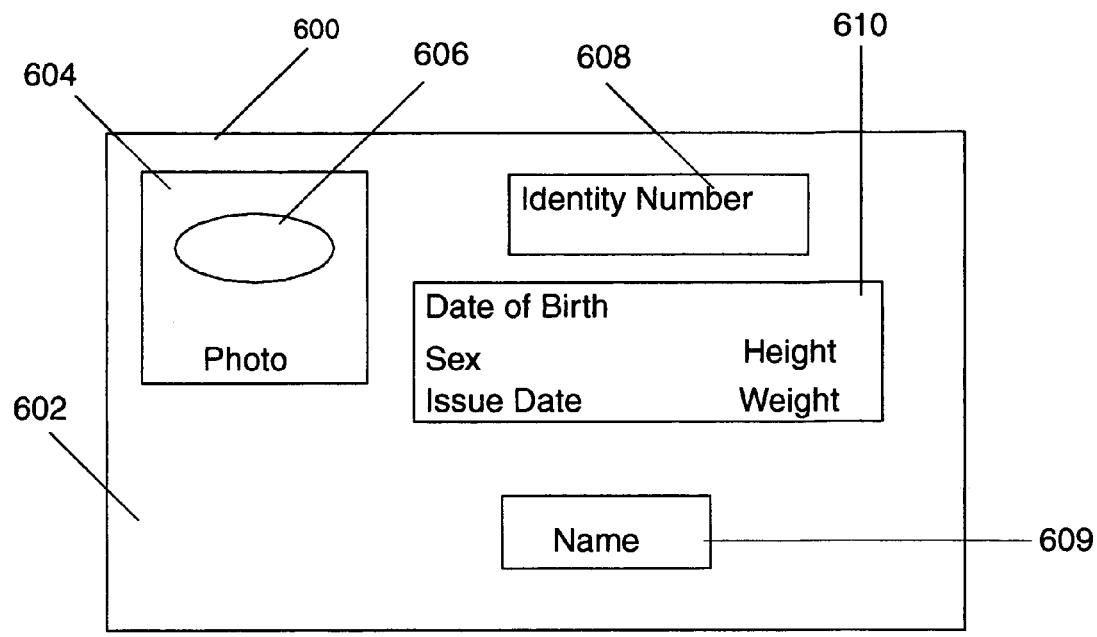
FIG. 18A is a front side of an exemplary ID card for authentication according to yet another embodiment of the present invention.

As illustrated by way of example in FIGS. 18(A-C), another embodiment of the present invention is to apply an authentication process for identification on the Internet. Currently, there is great demand and need for web sites to be able to confirm the sex and age of visitors. In other words, it is not possible to determine whether a visitor is lying about their identity on the Internet or not. With the present invention, however, this problem can be solved by using an ID or driver's license card that is tied to a communication device. State and federal agencies commonly issue identity cards, such as driver's licenses, personal ID cards, and passports. For example, in FIG. 18A, the front side 602 of an identity card 600, such as a driver's license, is shown. Identity cards typically have a person's name 609, an identity number (such as driver's license number) 608, and the person's identity information 610 such as their date of birth, sex, height, and weight. The person's photo 604 completes the identity card.

Presently, identity cards, like credit cards are not tied to communication devices, however just as a credit-card 40 can be tied to a communication device 18 with communication address 12, an identity card 600 can be tied to a communication device 618 with communication address 612. Internet identity verification is achieved through an exemplary process described in FIG. 18C. For example, the owner of the card visits a web site such as one operated by Web Site 635 which requests the owner's driver's license or unique ID number 608. The owner enters the requested information 611, the Web Site 635 then sends the identity number 650 and the identity information it wants confirmed such as the person's age and sex to the authorization agent 625. The authorization agent 625 processes the request. Just as a credit check first determines whether the credit card 40 is still active and whether it has sufficient credit or not, the authorization agent in this embodiment checks its data and confirms the owner's age and if requested, the owner's sex. If the identity information does not match, such as the wrong age or sex, it then immediately notifies the Web Site 635 of this error. In this case the Merchant would then deny entry or request a correction from the owner.

On the other hand, if the age and other data are correct, then the authorization agent, through its data bank identities the communication address 612 connected to the identification number 608 and requests confirmation 660 that the owner of the card 617 is using his ID 602 to enter the Web Site 635 web site. The owner of the card 617, then responds 660' to the confirmation request 660, either denying the use of the identity card use or confirming its use in a fashion identical with the use of a credit-card tied to a communication device. The authorization agent 625 then sends a response 650', that either confirms the person using the ID is indeed the owner of the ID card, in which case the Web Site lets the owner to enter the Web site, or the authorization agent 625 response 650' informs the Web site that the person using the ID may not be the owner of the ID, in which case the Web Site denies entry.

Included in the authorization response 650', may include information about the person's sex, age, and other customer approved data. Alternatively, there are many ways to encode identity information on the card that may speed up the identification process. For instance, a digital watermark 606, such as a Digimarc digital watermark, can be incorporated into the photo 604 or surface of the card 602 which is invisible to the human eye, but is detectable to a PC camera. This mark could contain not only the person's name 609, but the person's identity information 610, identity number 608, and optionally the person's preferred communication device 612 and that device's IP address or communication address 612. This digital watermark 606 could be hidden in the front of the identity card as in shown by way of example in FIG. 18A, or alternatively, a digital watermark 606' could be placed on the back of the card as shown by way of example in FIG. 18B.

Figure 18B:
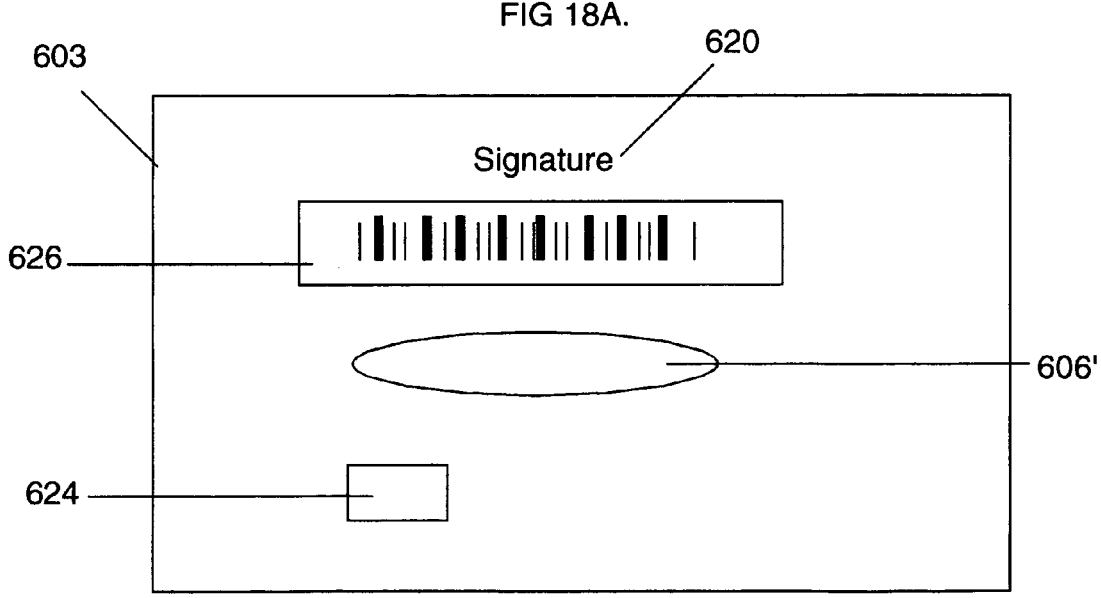
FIG. 18B is a back side of the exemplary ID card of FIG. 18A.
Figure 18C:
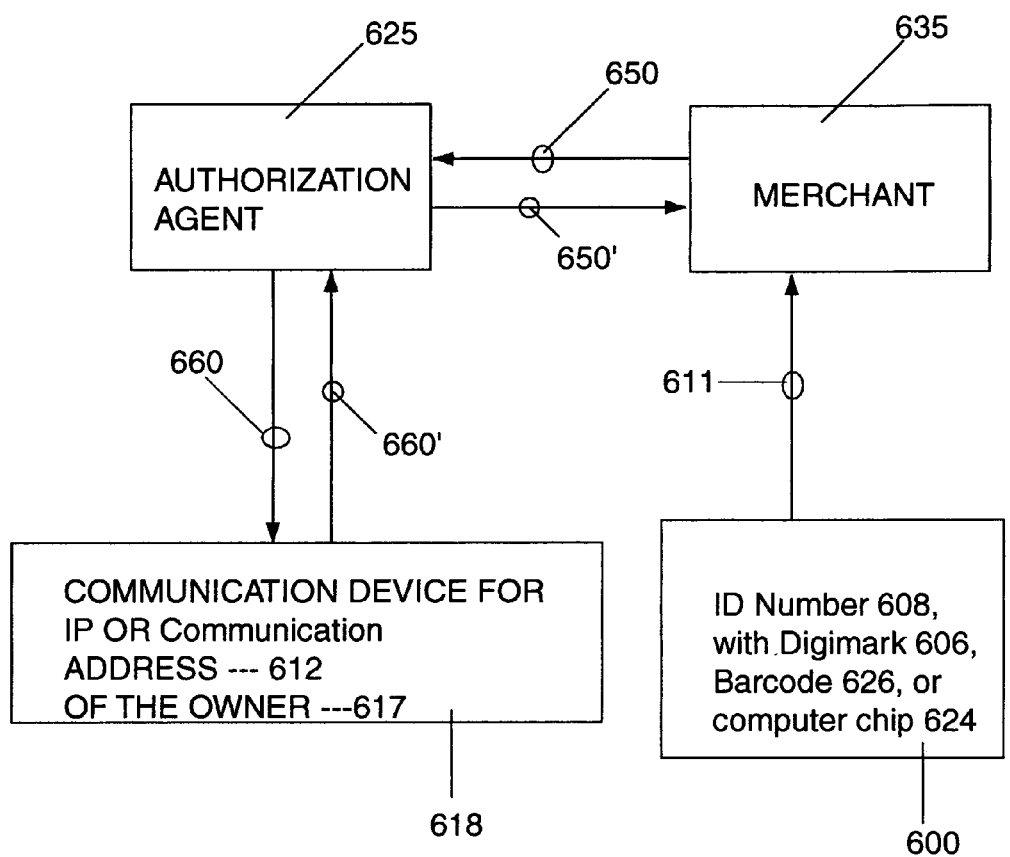
FIG. 18C is an exemplary block diagram for authenticating an ID card according to still another embodiment of the present invention.

In FIG. 18B, the back of an identity card is shown with a variety of other ways of storing encoded information of the person. For instance, a typical driver's license may includes both a person's signature 620, as well as bar code 626, when uncoded provides person's name 609, person's identity information 610, and identity number 608. The person's communication device 612 and the device address 617 could also be encoded into this bar code 626. Note that the bar code could be the standard 1D (single lines), 2D bar code (both horizontally broken and vertically broken lines), or some future bar code configuration yet to be invented. In addition, other ways of encoding information, such as electronic chip 624, could be used.

Moreover, the bar code methods can now be easily inputted using what is called a Digicat, which is a cheap bar code reader for a PC. A digital watermark is easily inputted into a PC using a PC camera connected to a PC that runs special software such as Digimarc MediaBridge software. A computer chip in the ID card may be read by an electronic reader, such as one distributed by American Express with their Blue American Express Card. If the card 600 contains one or more of the encoded information methods described above, the authentication process as described in FIG. 18C may be used. Here, the difference is that information is transmitted to the Web Site 635. For instance, if a digital water mark 606 or 606' is embedded into the ID, the user would show the card to a PC camera attached to his PC. Software on the computer then sends user's identity information 611 to the Web Site 635. This information may be the person's ID number 608, or might include a host of other data, such as the person's age and sex 610, name 609, communication device address 612, etc.

One of the advantages of encoding the above information is that the owner need not input his age and sex into the computer, and the first step of the identity authentication process could be skipped, because the digital watermark may transmit the person's age, sex and other identity information along with the ID number 608. The same is true if a barcode 626, chip 624, or some future encoded data method yet to be invented is used. The encoding of the information effectively ties the person's age and other information to their ID number. However, since someone can steal or copy ID cards, just as they can copy credit cards, the use of these encoded methods does not give a high identity security method.

Another use of this ID authentication process is to protect children against child molesters. Parents could install ID firewall, that would require people entering the chat room with children to enter ID info that is confirmed by the authorization agent. In this case, the home PC is the "web site", and outside users who wish to chat with the children, for example, must pass this ID check before the computer will allow data transfer from a web site. Web Sites that run chats would be wise to use this method to protect their visitors from sexual predators.

In closing, it is noted that specific illustrative embodiments of the invention have been disclosed hereinabove. However, it is to be understood that the invention is not limited to these specific embodiments. Thus, by way of example but not of limitation, other Authorization agents that would interface as forth party or new third party agents are also within the scope of the present invention. In other words, the existing Authorization agents may contact another Authorization agent, say a web based Authorization agent that kept track of the Internet or personal communicator address of the cardholder and initiated the consumer approval process. Once the consumer approves of the request, the first Authorization agent could contact the second Authorization agent that served the merchant to complete the credit card purchase. Accordingly, the invention is not limited to the precise embodiments described in detail hereinabove. With respect to the claims, it is applicant's intention that the claims not be interpreted in accordance with the sixth paragraph of 35 U.S.C. §112 unless the term "means" is used followed by a functional statement.

I claim:

1. A method for verifying that an authorized entity is using a credit card through an Internet, comprising:
   entering a password that is known only to an authorized entity that can use a corresponding credit card;
   monitoring a latest Internet address where the authorized entity is visiting through the Internet;

receiving a request to authorize a transaction from an Online business with a corresponding Internet address, wherein the request is received by an authorization agent, wherein the authorization agent is a bank that issued the credit card to the authorized entity, a credit card company, or an agent of the bank or the credit card company, and wherein the request includes a credit card number; and comparing the latest Internet address with the corresponding Internet address from the Online business:
- if the Internet addresses match, then sending from the authorization agent to the Online business an approval response to the request;
- if the Internet addresses do not match, then sending from the authorization agent to the Online business a non-approval response to the request.

2. A method according to claim 1, further including:

monitoring whether the authorized entity is still log onto the Internet:

if the authorized entity has logged off the Internet, then not approving any request for authorizing the transaction.

3. A method for parties to authenticate a transaction, comprising:
- acquiring a corresponding contact information for each parties involved in a transaction;
- providing an authorization agent to acquire the corresponding contact information, wherein the authorization agent is a bank, a credit card company, or an agent of the bank or the credit card company; and
- sending electronically an authorization request from the authorization agent to the corresponding contact information for each of the parties involved in the transaction, wherein:
  - approving the transaction if all of the parties to the transaction approve of the authorization request; and
  - disapproving the transaction if any of the parties to the transaction disapprove of the authorization request.

4. A method according to claim 3, wherein the corresponding contact information is an IP address.

* * * * *